(12) United States Patent
Hockett

(10) Patent No.: US 11,087,645 B1
(45) Date of Patent: Aug. 10, 2021

(54) VEHICLE MOUNTED SIGN BRACKET SYSTEM

(71) Applicant: Patrick Emery Hockett, Medina, TN (US)

(72) Inventor: Patrick Emery Hockett, Medina, TN (US)

( * ) Notice: Subject to any disclaimer, the term of this patent is extended or adjusted under 35 U.S.C. 154(b) by 0 days.

(21) Appl. No.: 17/026,119

(22) Filed: Sep. 18, 2020

(51) Int. Cl.
*G09F 21/04* (2006.01)
*G09F 7/18* (2006.01)
*B62D 59/04* (2006.01)
*G09F 7/22* (2006.01)
*B62D 33/06* (2006.01)

(52) U.S. Cl.
CPC .............. *G09F 7/18* (2013.01); *B62D 33/06* (2013.01); *B62D 59/04* (2013.01); *G09F 7/22* (2013.01); *G09F 21/048* (2013.01); *G09F 2007/1865* (2013.01)

(58) Field of Classification Search
CPC ... G09F 21/04; G09F 7/18; G09F 7/22; G09F 21/048; G09F 2007/1865; B62D 33/06; B62D 59/04
USPC ........................... 40/588, 590; 296/21, 186.4
See application file for complete search history.

(56) References Cited

U.S. PATENT DOCUMENTS

| | | |
|---|---|---|
| 2,724,917 A | 11/1955 | Norfleet |
| 3,740,882 A | 6/1973 | Lanphere et al. |
| 3,802,103 A | 4/1974 | Neff |
| 4,475,299 A | 10/1984 | Nelson |
| 6,037,866 A * | 3/2000 | Leibowitz ................ B60Q 7/00 340/431 |
| 6,092,319 A | 7/2000 | Hicks |
| 6,282,822 B1 | 9/2001 | Rinzler et al. |
| 7,051,465 B2 | 5/2006 | Slesinski |
| 7,114,756 B2 | 10/2006 | Nelson |
| 7,774,966 B2 | 8/2010 | Rosa |
| 7,784,207 B2 | 8/2010 | Curtis |
| 8,296,978 B2 | 10/2012 | Stewart |
| 9,934,709 B2 | 4/2018 | Lanham |
| 2005/0150147 A1 | 7/2005 | Berryman |

FOREIGN PATENT DOCUMENTS

JP 2001287600 A * 10/2001 ........... G09F 21/048

* cited by examiner

*Primary Examiner* — Cassandra Davis
(74) *Attorney, Agent, or Firm* — Shane Cortesi

(57) ABSTRACT

A bracket system for mounting a sign to a vehicle is described. The bracket system may be designed to attach to the hinges and lock rods of the left and right doors of a tractor trailer. The system may include a sign frame that includes a left horizontal bracket(s) that is connected to the left hinge(s) of the left door, a right horizontal bracket(s) that is connected to the right hinge(s) of the right door, a left lock rod bracket(s) connected to the left lock rod, and a right lock rod bracket(s) connected to the right lock rod. Left sign and right sign panels may be connected to the sign frame. The sign panels, the horizontal brackets and the lock rod brackets may be configured to swing open and closed with the respective doors. A multi-part clamp may be used to attach the lock rod brackets to the lock rods.

18 Claims, 19 Drawing Sheets

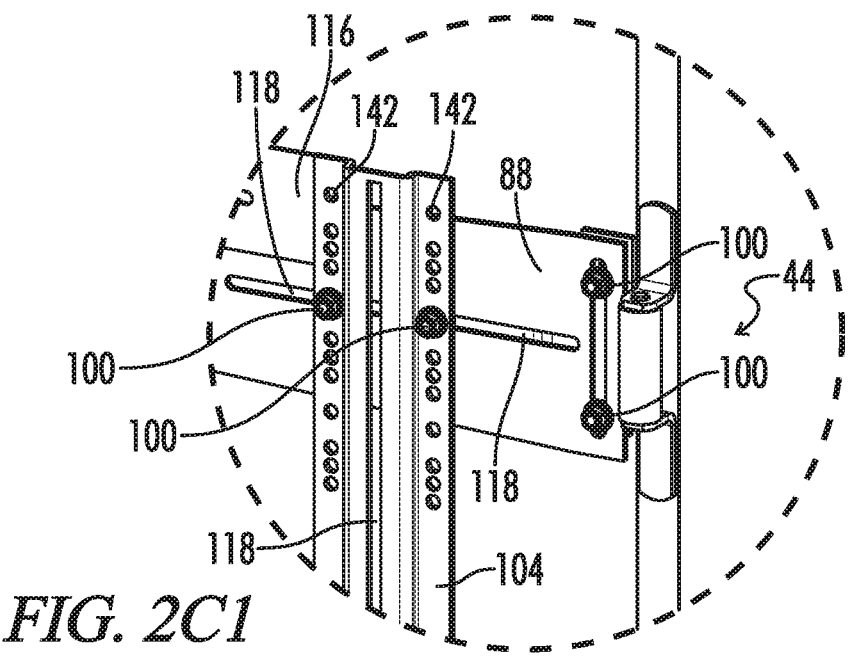
FIG. 2C1
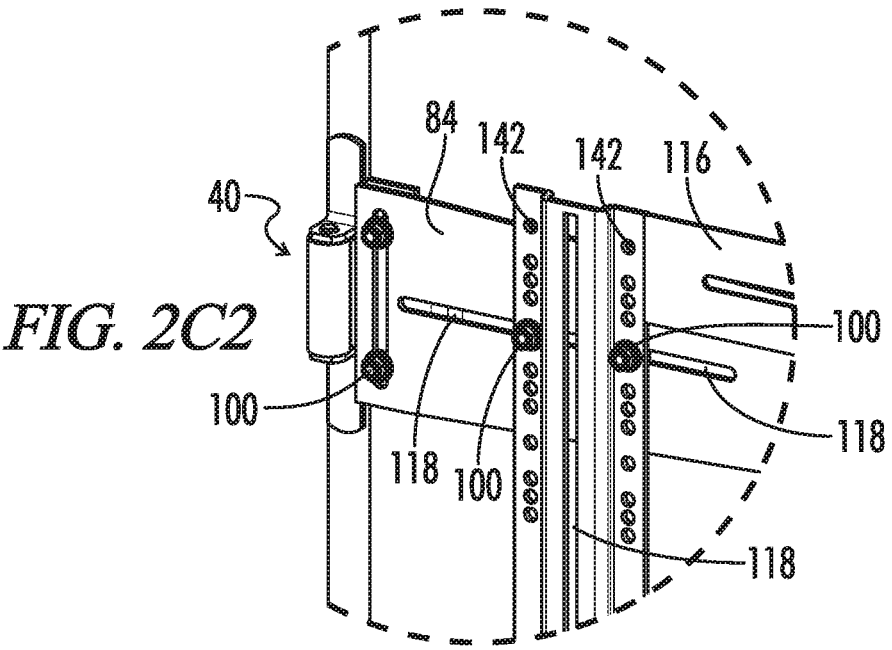
FIG. 2C2

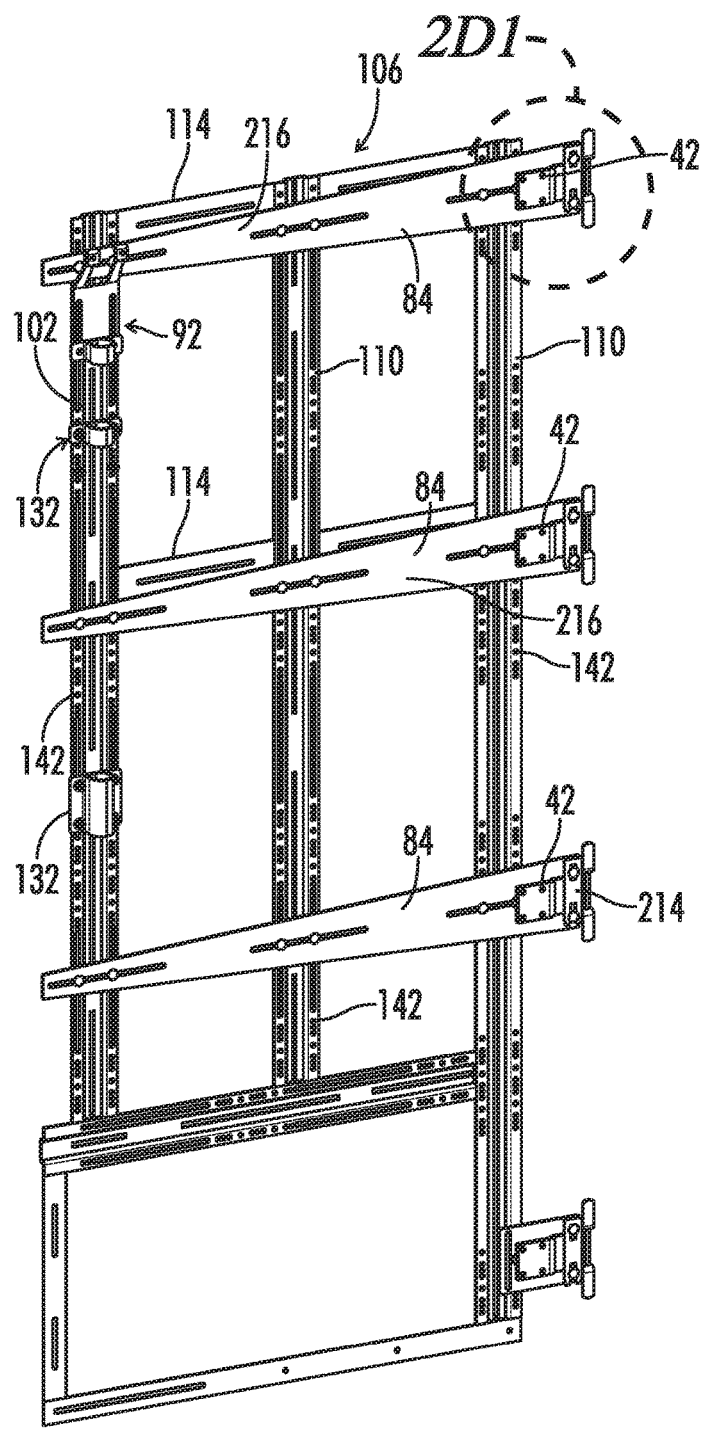
FIG. 2D
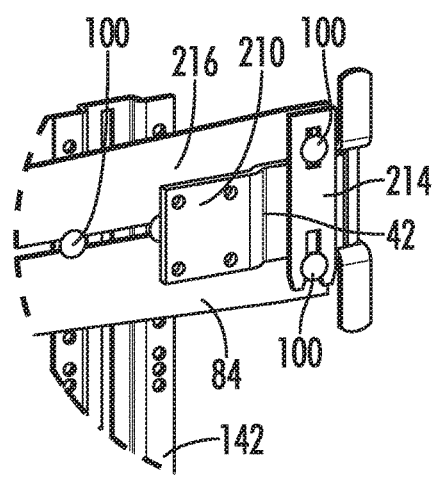
FIG. 2D1

VEHICLE MOUNTED SIGN BRACKET SYSTEM

BACKGROUND

Technical Field

The present invention relates to a bracket system for mounting a sign on a vehicle, such as the rear of a tractor trailer.

Background of the Invention

Signs displaying advertisements have been used on the top of vehicles such as taxicabs. Others have looked to use tractor trailers for displaying advertisements.

For example, U.S. Pat. No. 8,296,978 (the '978 patent) describes a flexible sign for attachment to the rear of a tractor trailer. FIG. 1 of the '978 patent shows the sign being mounted to a door of a tractor trailer that lifts upwards, whereas FIG. 12 of the '978 patent shows the sign being mounted to a tractor trailer with van style left and right rear doors that open outward/horizontally. The '978 patent does not contain detailed wording on how the signs attach to the hinges but FIGS. 19-21 appear to show that support line end holes of the hinge catches slide over the hinge bolts on the tractor trailer and that an elongated aperture is bolted to the hinge plate of the tractor trailer. One problem of the system of the '978 patent is that, as described in Columns 4, Line 65 to Column 5, Line 3, the sign prevents the doors from opening outward.

U.S. Pat. No. 2,724,917 (the '917 patent) describes a method of attaching a sign to a tractor trailer with van style left and right rear doors that open outward/horizontally using fasteners. However, the attachment mechanism of the '917 patent requires drilling a hole in the doors of the tractor trailer. In addition, as shown in FIG. 1, the sign is not able to use the full area on the rear of the trailer door. More particularly, the sign does not cover the bottom of the lock rods because the '917 patent does not provide a solution for accessing the lock rods other than leaving them uncovered.

U.S. Pat. No. 7,774,966 (the '966 patent) describes attaching a sign that swings outward/horizontally to the rear of a tractor trailer using a hinge plate that attaches to the left side of the tractor trailer. Among other things, it is unclear how sturdy the sign would be given that it's only attached permanently to the left side. In addition, the '966 patent does not provide significant details on how the hinges attach to the tractor trailer but presumably attachment would require drilling holes into the tractor trailer panels.

Thus, there is a need for new apparatuses that display signs on tractor trailers, particularly those that are able to be readily attached and removed without drilling holes or otherwise modifying the existing structure on the tractor trailer.

SUMMARY OF THE INVENTION

The present disclosure provides a system that may be used to display a sign on the rear of a tractor trailer. In certain embodiments, the system is used to mount to hinges and lock bars of a tractor trailer with van style left and right rear doors that open outward/horizontally. Optionally, the system may still allow the rear doors to open outward even when the sign is present.

BRIEF DESCRIPTION OF THE DRAWINGS

FIG. 2C1 illustrates a rear perspective view of the area of the sign frame in FIG. 2A that is circled and labelled as 2C1.

FIG. 2C2 illustrates a rear perspective view of the area of the sign frame in FIG. 2A that is circled and labelled as 2C2.

FIG. 2D illustrates a front perspective view of the portion of the sign frame of FIG. 2A that is connected to the left door through the left lock rod and the left hinge plates; in FIG. 2D, the left lock rod bracket is not shown.

FIG. 2D1 illustrates a front perspective view of the area of the sign frame in FIG. 2D that is circled and labelled as 2D1.

in FIG. 13 the fasteners attaching the lock rod bracket to the c-shaped pieces and clamp are not shown.

DETAILED DESCRIPTION

Figure 1:
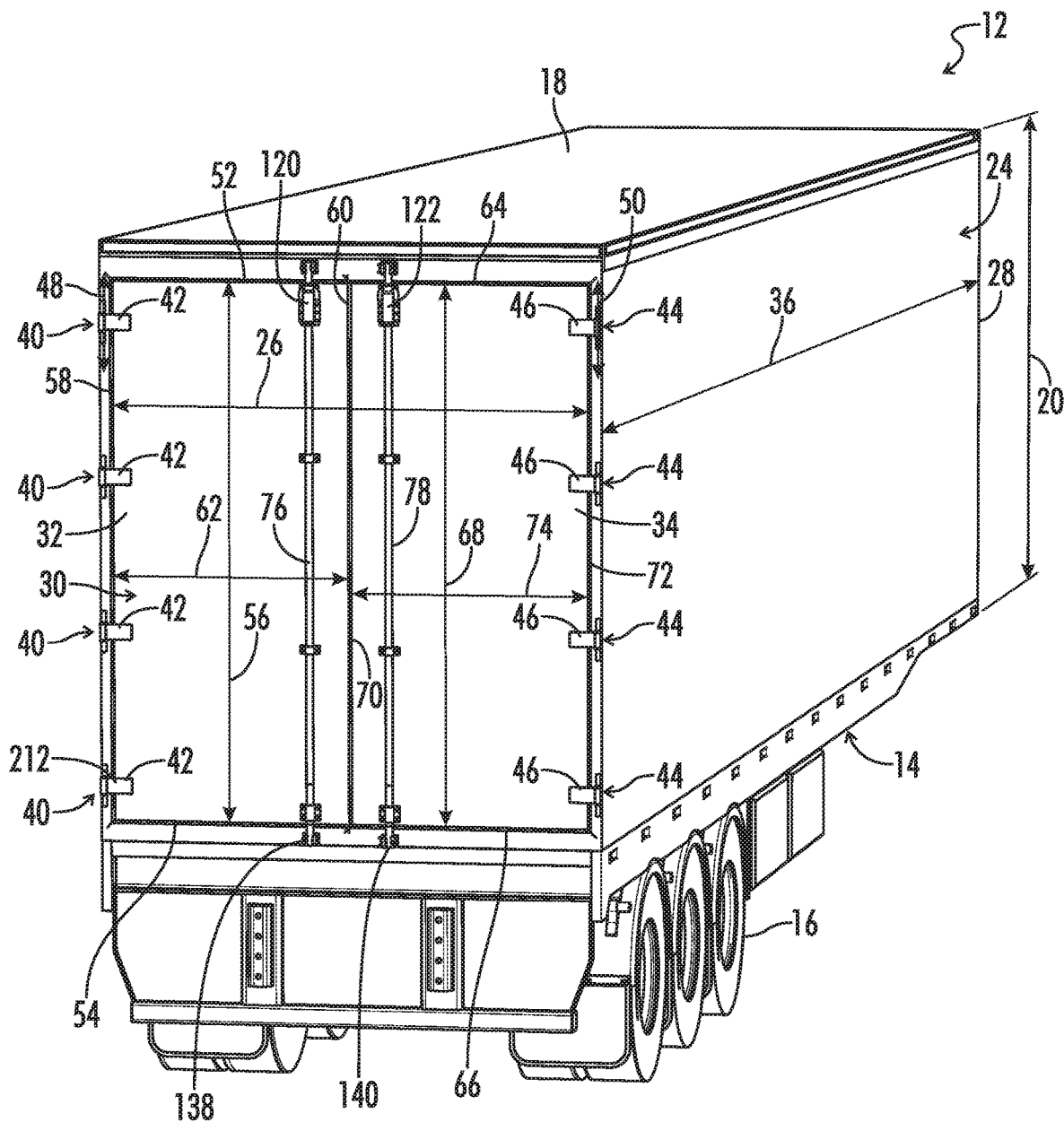
FIG. 1 illustrates a rear perspective view of a prior art tractor trailer with the left and right doors in the closed position.

With reference to FIGS. 2A-20, the present disclosure provides a sign frame 82 for mounting a sign to a vehicle, such as the rear of a trailer 12 pulled by a tractor (i.e., a tractor trailer). In the drawings, not all reference numbers are included in each of the drawings for the sake of clarity. FIGS. 2A-19 are drawn generally to scale, however, it will be appreciated that other dimensions are possible.

As shown in FIGS. 2A-20 and discussed in further detail herein, the sign frame 82 may include one or more of the following combinations of parts: 1) left and right horizontal brackets 84,88 that attach to the hinge plates 42,46 of the left and right doors 32,34 of the trailer 12 and connect the hinge plates 42,46 to the left and right sign panels 96,98; 2) left and right lock rod brackets 92,94 that are connected to the lock rods 76,78 and connect the lock rods 76,78 to the left and right sign panels 96,98; and 3) clamps 132 that at least partially surround the lock rods 76,78 and connect the lock rods 76,78 to the left and right sign panels 96,98 optionally through the left and right lock rod brackets 92,94. The components described herein preferably include a plurality of holes, in some cases slots 118, for receiving fasteners 100 to connect the components described herein. These features will be described with greater particularity below.

An exemplary trailer 12 to which the sign frame 82 may mount is shown in FIG. 1. It will be understood that the trailer 12 shown is exemplary. More particularly, as shown in FIG. 1 (and also depicted throughout the remaining figures), the trailer 12 may include a bottom 14, a plurality of wheels 16 extending below the trailer bottom 14 and configured to ride along a street, a top 18, a height 20 extending from the top 18 to the bottom 14, a left side (not shown), a right side 24, a width 26 extending from the left side (not shown) to the right side 24 and generally perpendicular to the height 20, a front 28, a rear 30 comprising a left door 32 and a right door 34, and a length 36 extending from the front 28 to the rear 30 and generally perpendicular to the width 26 and the height 20. In the present disclosure, the directional term "left side" refers to what is typically in the United States, the driver side (not shown), and the term "right side" refers to what is typically in the United States, the passenger side 24. The term "front" refers to the area of the trailer 12 that is typically near the tractor (not shown) where the passenger and driver sit that includes the motor (not shown). These terms are used similarly for other components of the trailer system 10—e.g., with "front" being the part of a component nearest to the tractor (not shown). The top 18, the bottom 14, the left side (not shown), the right side 24, the front 28, the left door 32 and the right door 34 may define a trailer interior (not shown). The left door 32 may be attached to a left hinge 40 comprising a left hinge plate 42 and the right door 34 may be attached to a right hinge 44 comprising a right hinge plate 46. The left hinge 40 may have a left pivot axis 48 generally parallel to the trailer height 20, and the right hinge 44 may have a right pivot axis 50 generally parallel to the trailer height 20. The left door 32 may be configured to swing outwardly about the left pivot axis 48 from a closed position to an open position and the right door 34 may be configured to swing outwardly about the right pivot axis 50 from a closed position to an open position. The left door 32 may include a left door top 52, a left door bottom 54, a left door height 56 extending from the left door top 52 to the left door bottom 54, a left door left side edge 58, a left door right side edge 60, and a left door width 62 extending from the left door left side edge 58 to the left door right side edge 60 and generally perpendicular to the left door height 56. Similarly, the right door 34 may include a right door top 64, a right door bottom 66, a right door height 68 extending from the right door top 64 to the right door bottom 66, a right door left side edge 70, a right door right side edge 72, and a right door width 74 extending from the right door left side edge 70 to the right door right side edge 72 and generally perpendicular to the right door height 68. Optionally, when the left and right doors 32,34 are in the closed position, the right edge of the left door 60 and the left edge of the right door 70 meet and the left and right door widths 62,74 are generally parallel to the trailer width 26. Optionally, when the left and right doors 32,34 are in the open position, the right edge of the left door 60 and the left edge of the right door 70 do not meet and the left and right door widths 62,74 are not generally parallel to the trailer width 26. Optionally, the trailer 12 comprises a left lock rod 76 extending generally parallel to the left door height 56 and a right lock rod 78 extending generally parallel to the right door height 68 and the left lock rod 76 and the right lock rod 78 are configured to secure the left and right doors 32,34 in the closed positions to secure the components inside the trailer interior (not shown). The left and right lock rods 76,78 may be rotatable by a handle (not shown but well known to those of ordinary skill) and the left and right trailer rear 30 may include latches 138,140 so that a user can lock the left and right doors 32,34 in the closed position. The trailer 12 may also be coupled to a tractor, for example, that may include a motor (not shown) configured to propel the trailer 12.

As shown in FIGS. 2A-19, unlike conventional trailers, a sign frame 82 may be disposed behind the left door and the right door. The sign frame 82 may include a left horizontal bracket 84 connected to the left hinge 40 and extending from the left hinge 40 towards the left lock rod 76 generally parallel to the left door width 62 and a right horizontal bracket 88 connected to the right hinge 44 and extending from the right hinge 44 toward the right lock rod 78 generally parallel to the right door width 74. The sign frame 82 may also include a left lock rod bracket 92 connected to the left lock rod 76 and located behind the left lock rod 76, and a right lock rod bracket 94 connected to the right lock rod 78, and located behind the right lock rod 78. As used herein, the term "behind" does not require that component is directly behind another component; rather, intervening components may be located between the two components. In this case, for example, the left lock rod clamps 132 may be located between the left lock rod 76 and the left lock rod bracket 92. Similarly, the right lock rod clamps 132 may be located between the right lock rod 78 and the right lock rod bracket 94.

Figure 11:
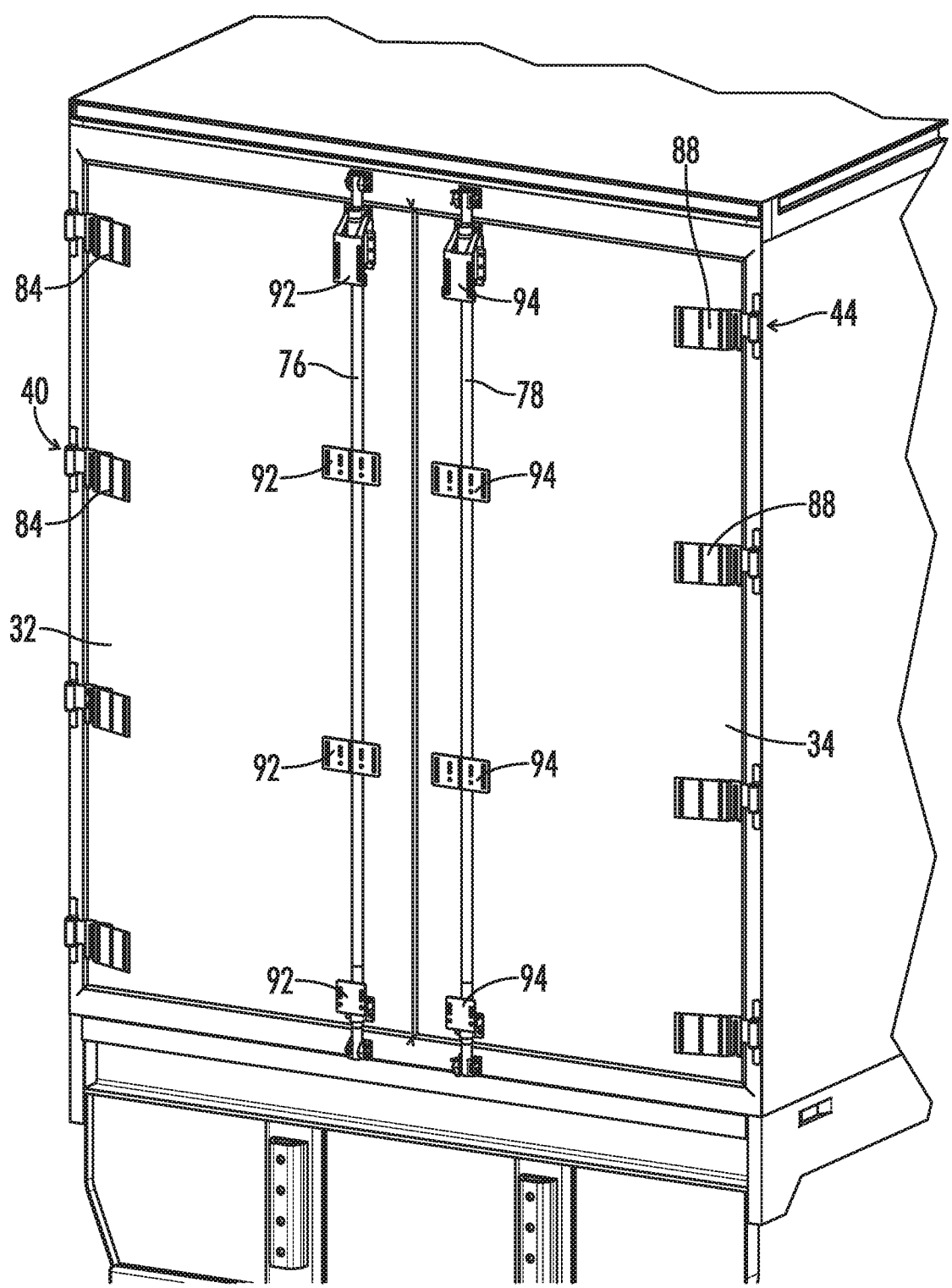
FIG. 11 illustrates a rear perspective view of a sign frame of another embodiment of the present invention attached to the left and right hinges and the left and right lock rods of the tractor trailer of FIG. 1.
Figure 11A:
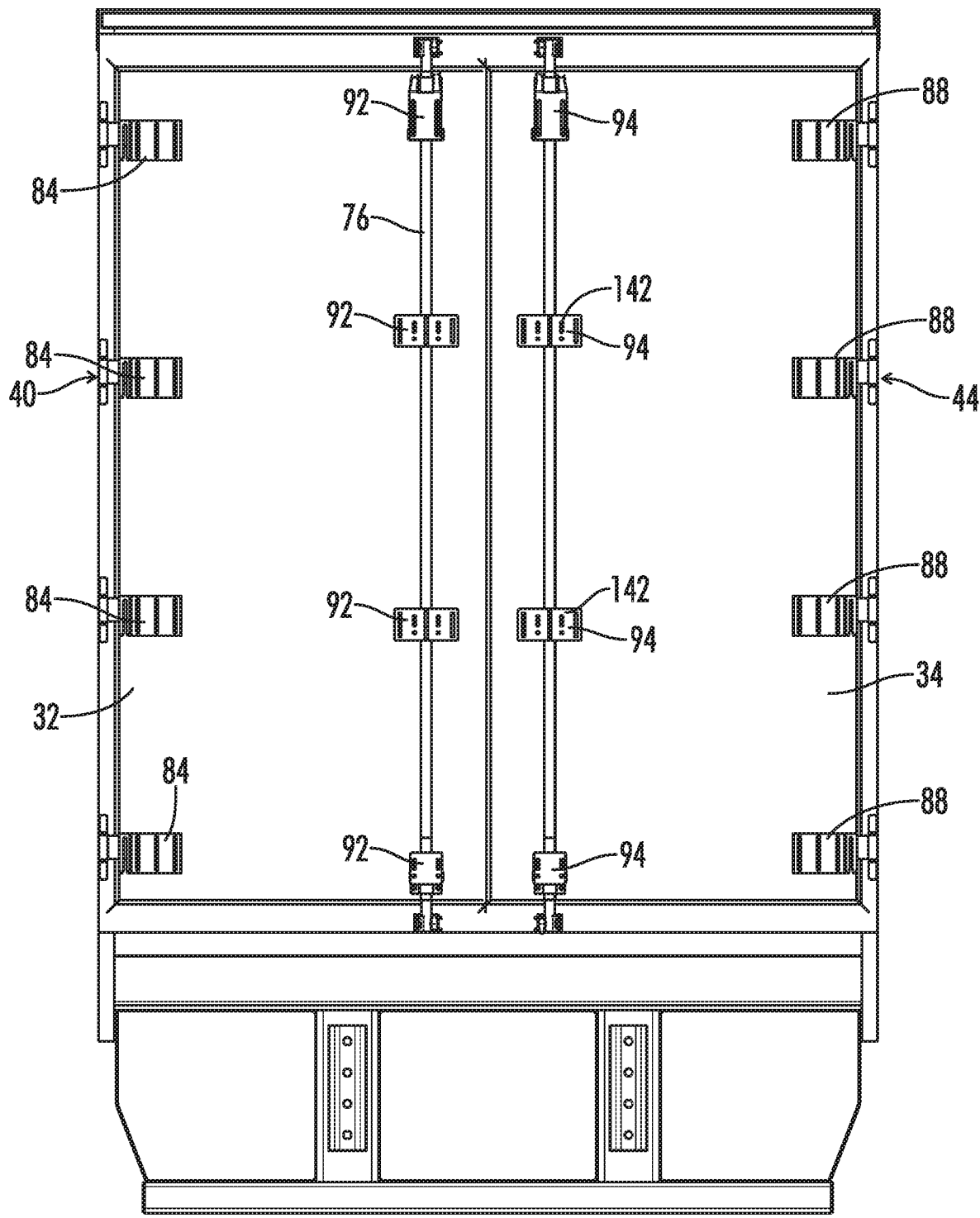
FIG. 11A illustrates a rear elevation view of the sign frame of FIG. 11.

As shown in FIGS. 1-4, the sign frame 82 may, for example, be comprised of two parts (i.e., a left portion 106 comprising components that are connected to the left door 32 and a right portion 108 comprising components that are connected to the right door 34). In such a case, the left and right portion 106,108 may be adjacent to each other and meet, for example, when the left and right doors 32,34 are in the closed position, as shown in FIG. 1-4. In other embodiments, as best seen in FIG. 11, the sign frame 82 may be comprised of multiple distinct, unconnected parts, though the unconnected parts connected to the left door 32 may move in a coordinated fashion with the left door 32 and the unconnected parts connected to the right door 34 may similarly move in a coordinated fashion with the right door 34. In short, it will be understood that the term "sign frame" does not require that all components be connected to each other.

Figure 2A:
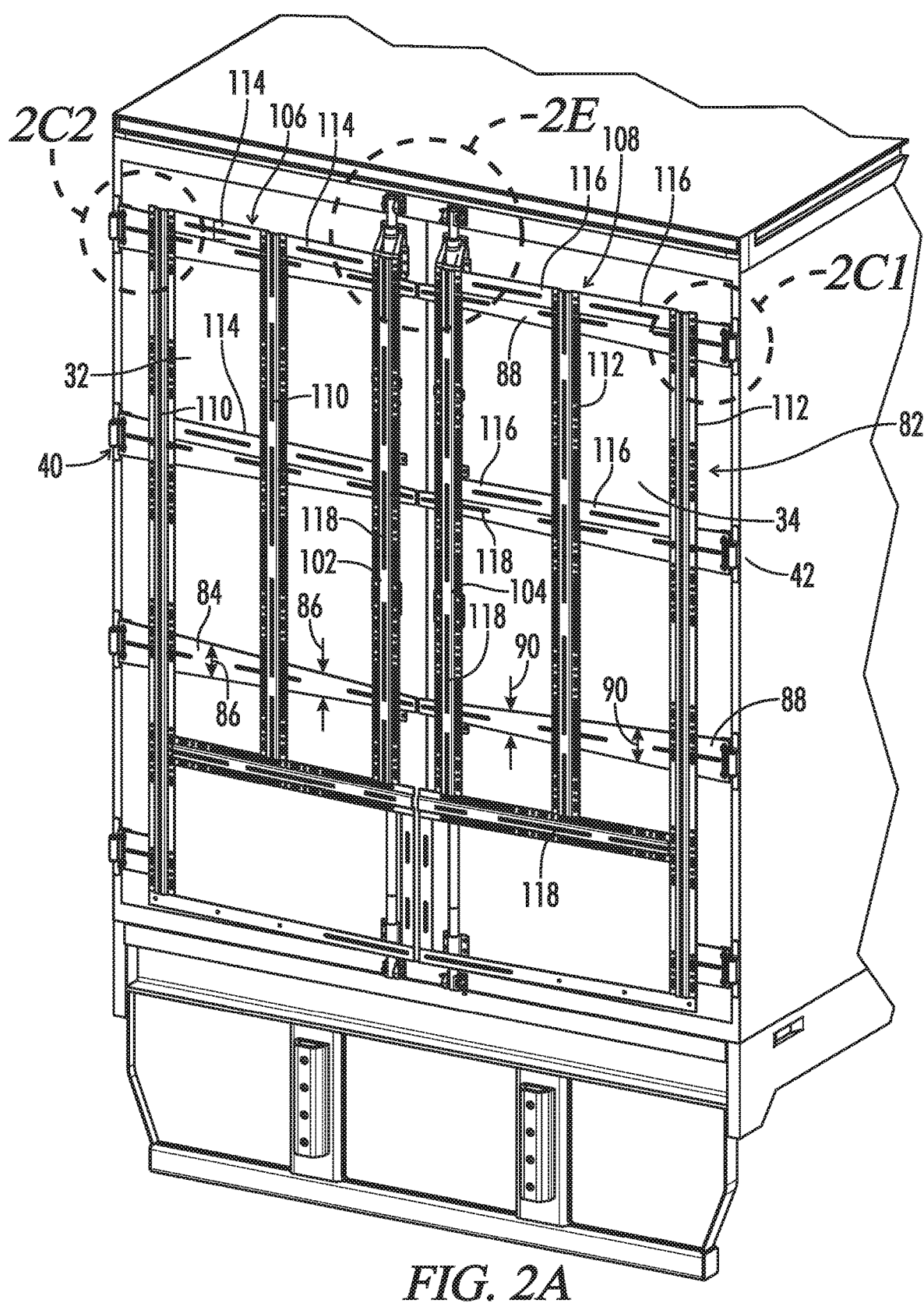
FIG. 2A illustrates rear perspective view of a sign frame of one embodiment of the present invention attached to the left and right hinges and the left and right lock rods of the tractor trailer of FIG. 1.
Figure 2B:
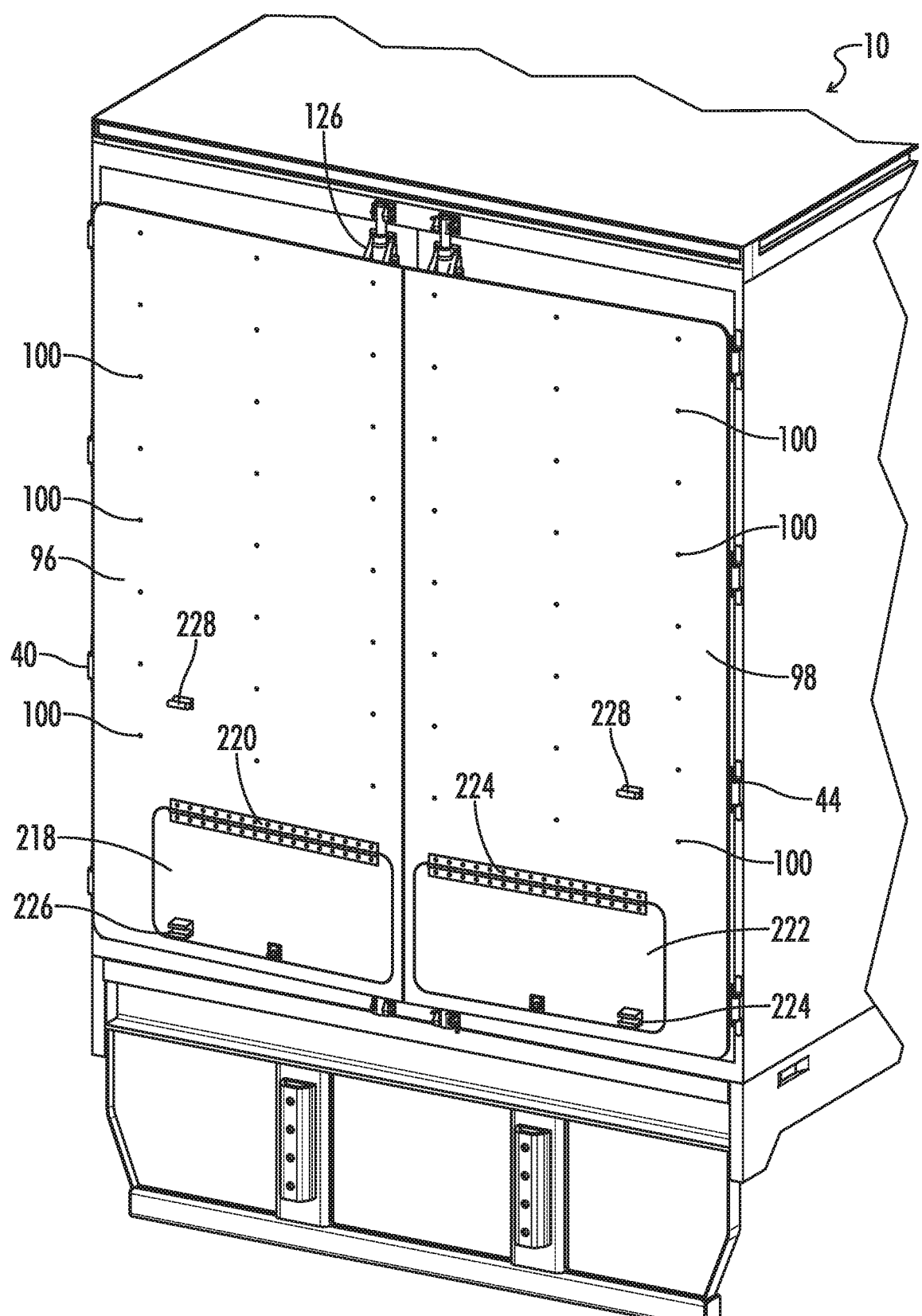
FIG. 2B illustrates a rear perspective view of a sign attached to the sign frame of FIG. 2A.
Figure 12:
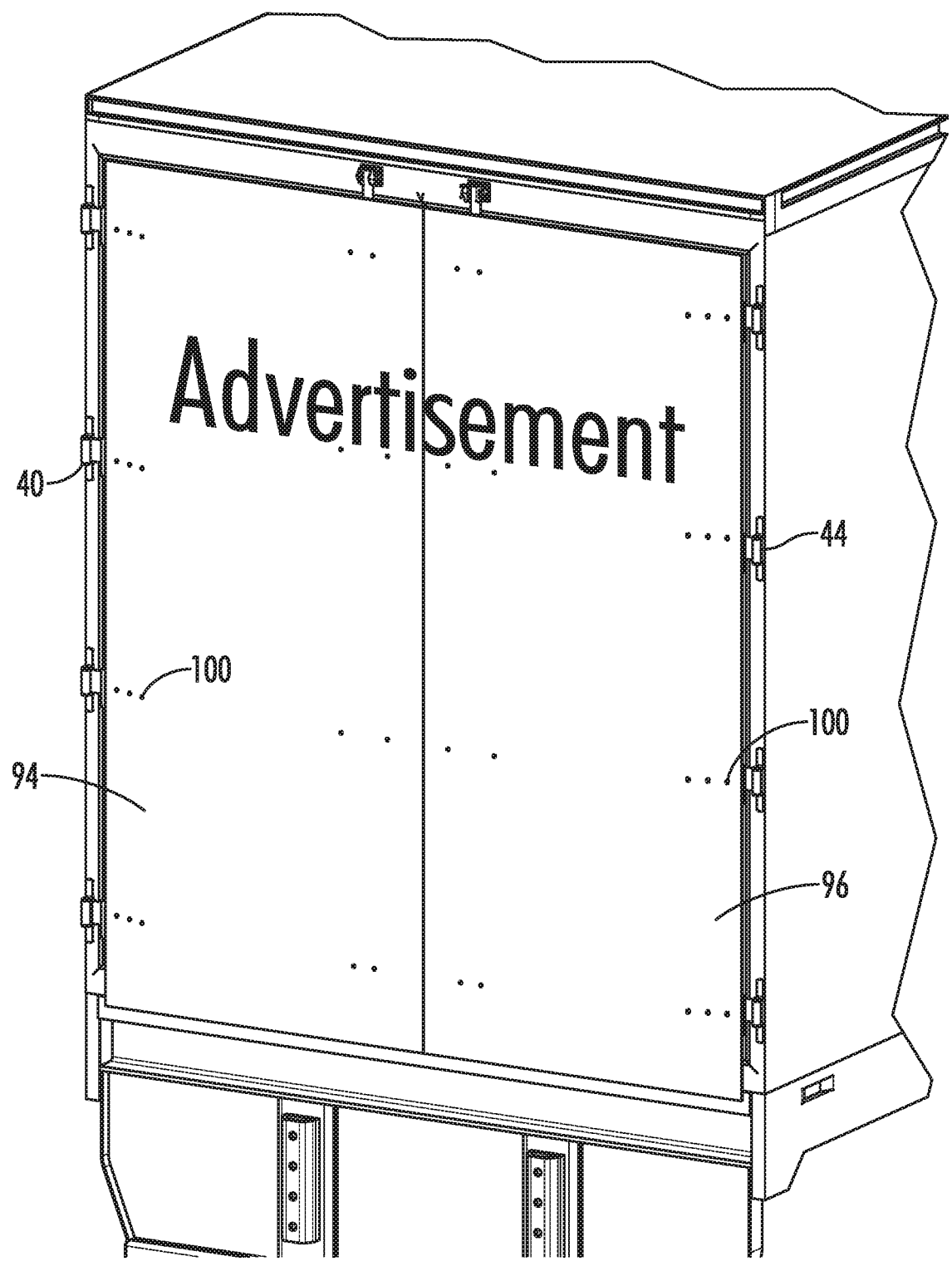
FIG. 12 illustrates a rear perspective view of a sign attached to the sign frame of FIG. 11.
Figure 13:
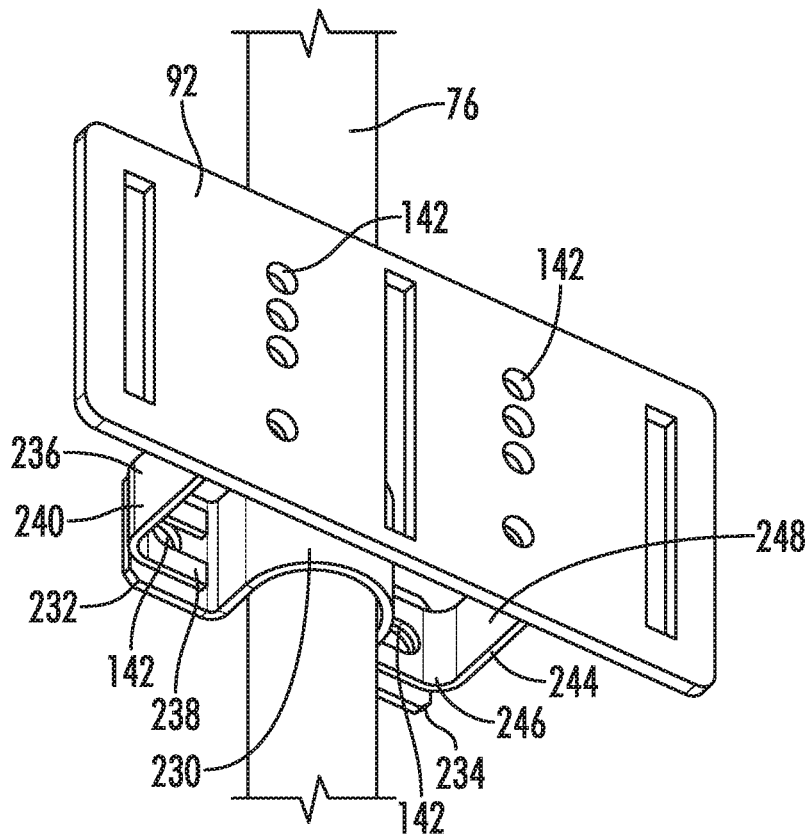
FIG. 13 illustrates a rear perspective view of a lock rod bracket and c-shaped pieces, associated clamp, which partially surrounds the lock rod, of the sign frame of FIG. 11.
Figure 14:
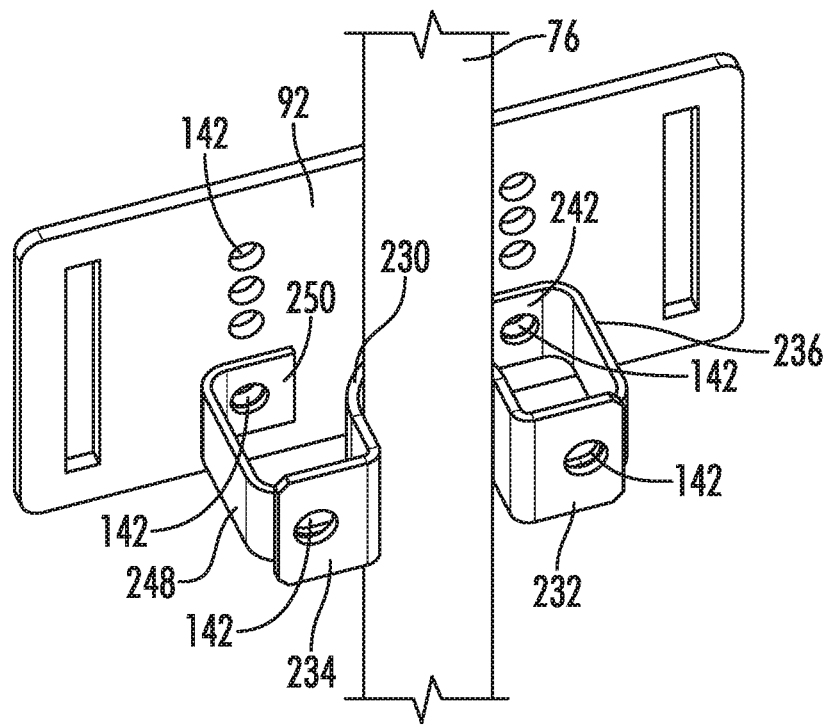
FIG. 14 illustrates a front perspective view of the lock rod bracket, clamp, lock rod, and c-shaped pieces of FIG. 13.
Figure 15:
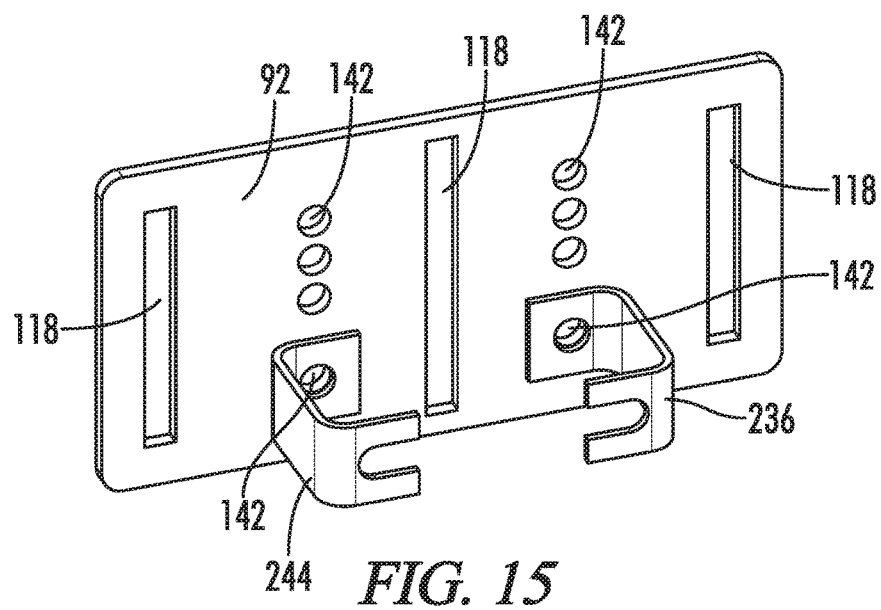
FIG. 15 illustrates a front perspective view of the lock rod bracket and c-shaped pieces of FIG. 13.
Figure 16:
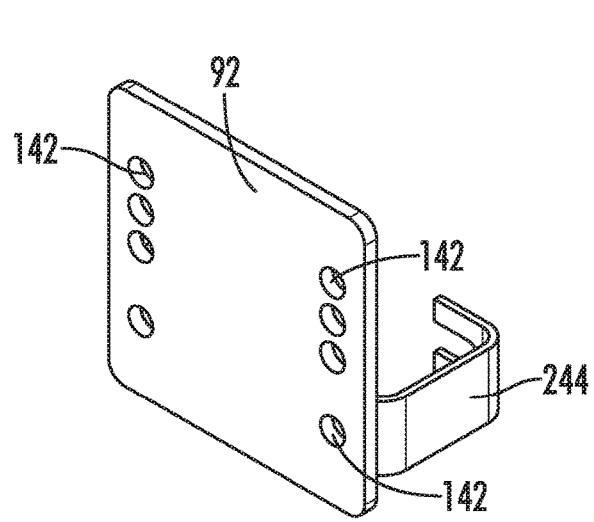
FIG. 16 illustrates a rear perspective view of another lock rod bracket and associated c-shaped pieces of the sign frame of FIG. 11.
Figure 17:
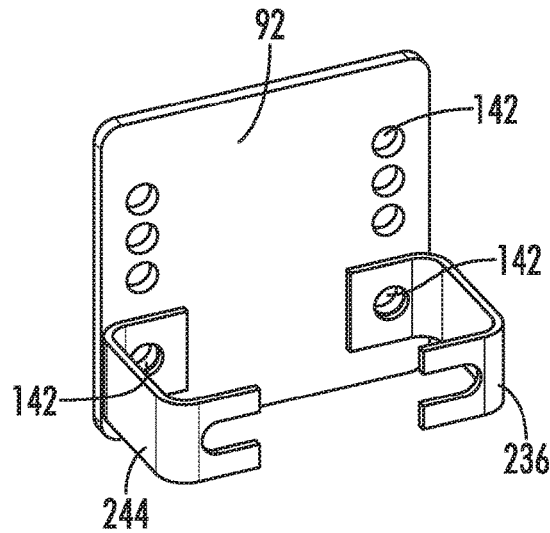
FIG. 17 illustrates a front perspective view of the lock rod bracket and c-shaped pieces of FIG. 16.

As shown in FIGS. 2B and 12, a sign may be disposed behind the sign frame 82 and connected to the sign frame 82. The sign may comprise a left sign panel 96 configured to swing with the left door 32 as the left door 32 swings from the closed position to the open position and a right sign panel 98 configured to swing with the right door 34 as the right door 34 swings from the closed position to the open position.

Optionally, as seen in FIGS. 2A, 2D, 3 and 4, the left horizontal bracket 84 is pennant-shaped and tapers in height 86 from the left hinge 40 towards the left lock rod 76 and the right horizontal bracket 88 is pennant-shaped and tapers in height 90 from the right hinge 44 towards the right lock rod 78.

Figure 2E:
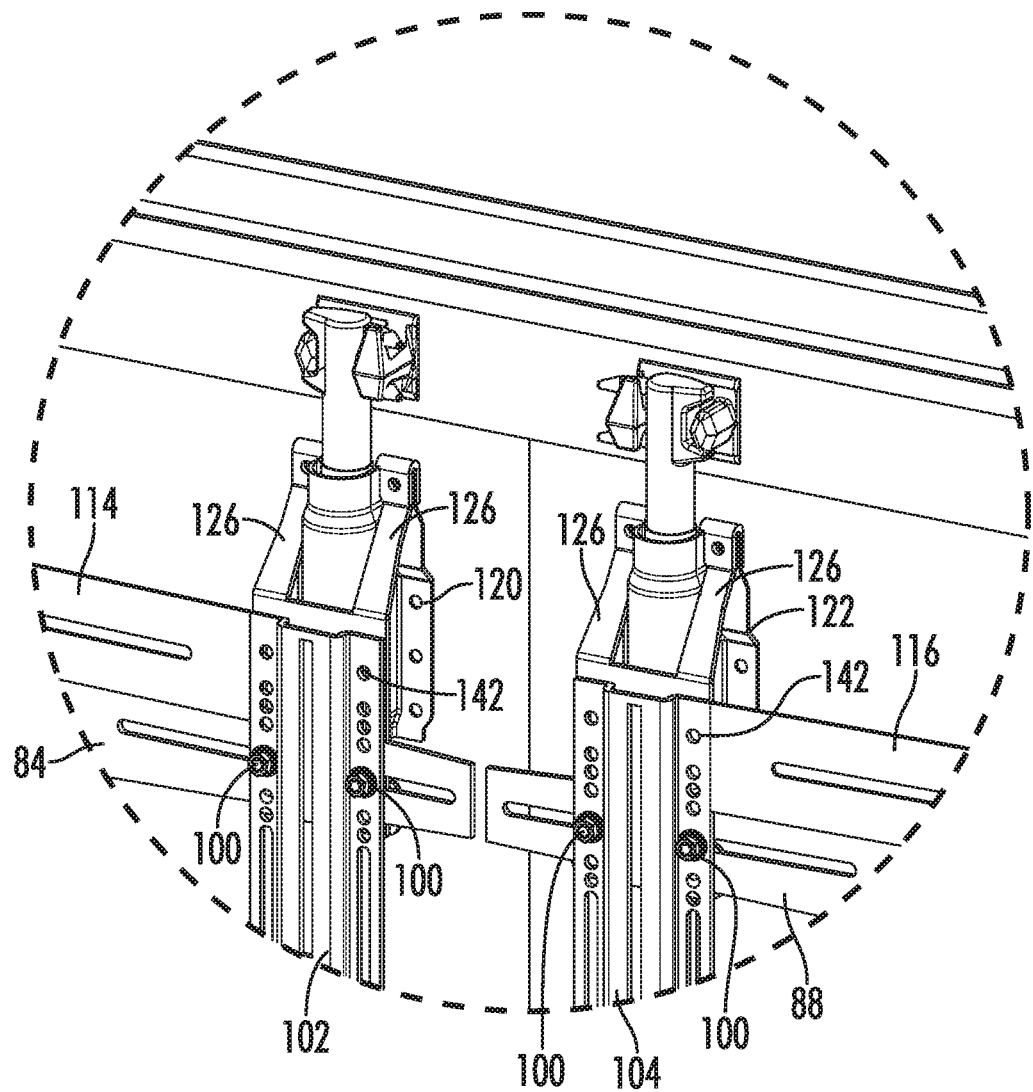
FIG. 2E illustrates a rear perspective view of the area of the sign frame in FIG. 2A that is circled and labelled as 2E.
Figure 3:
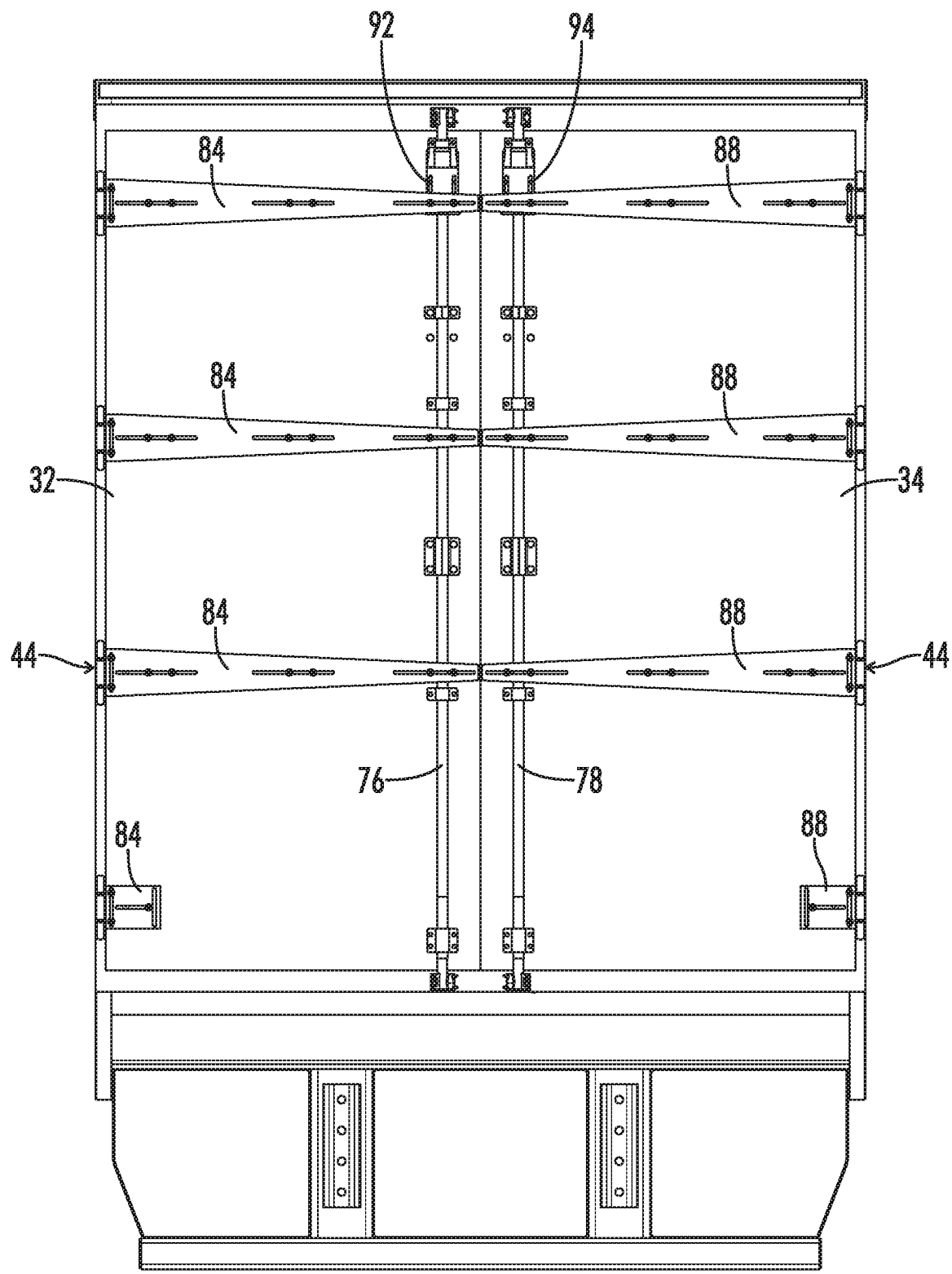
FIG. 3 illustrates a rear elevation view of the sign frame of FIG. 2A without the braces, without the framing surrounding the access panels and without the lock rod brackets.
Figure 4:
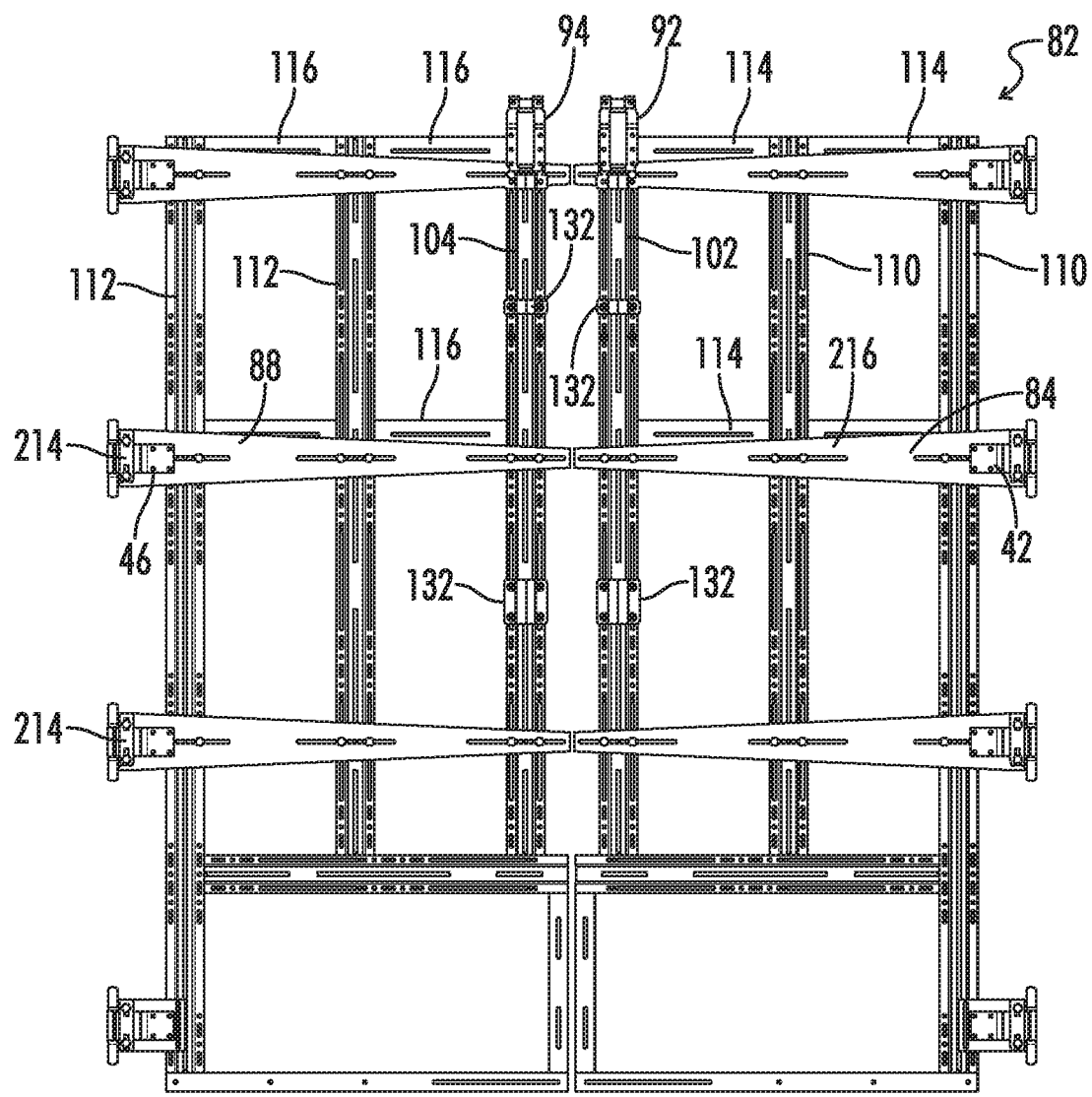
FIG. 4 illustrates a front elevation view of the sign frame of FIG. 2A.
Figure 5:
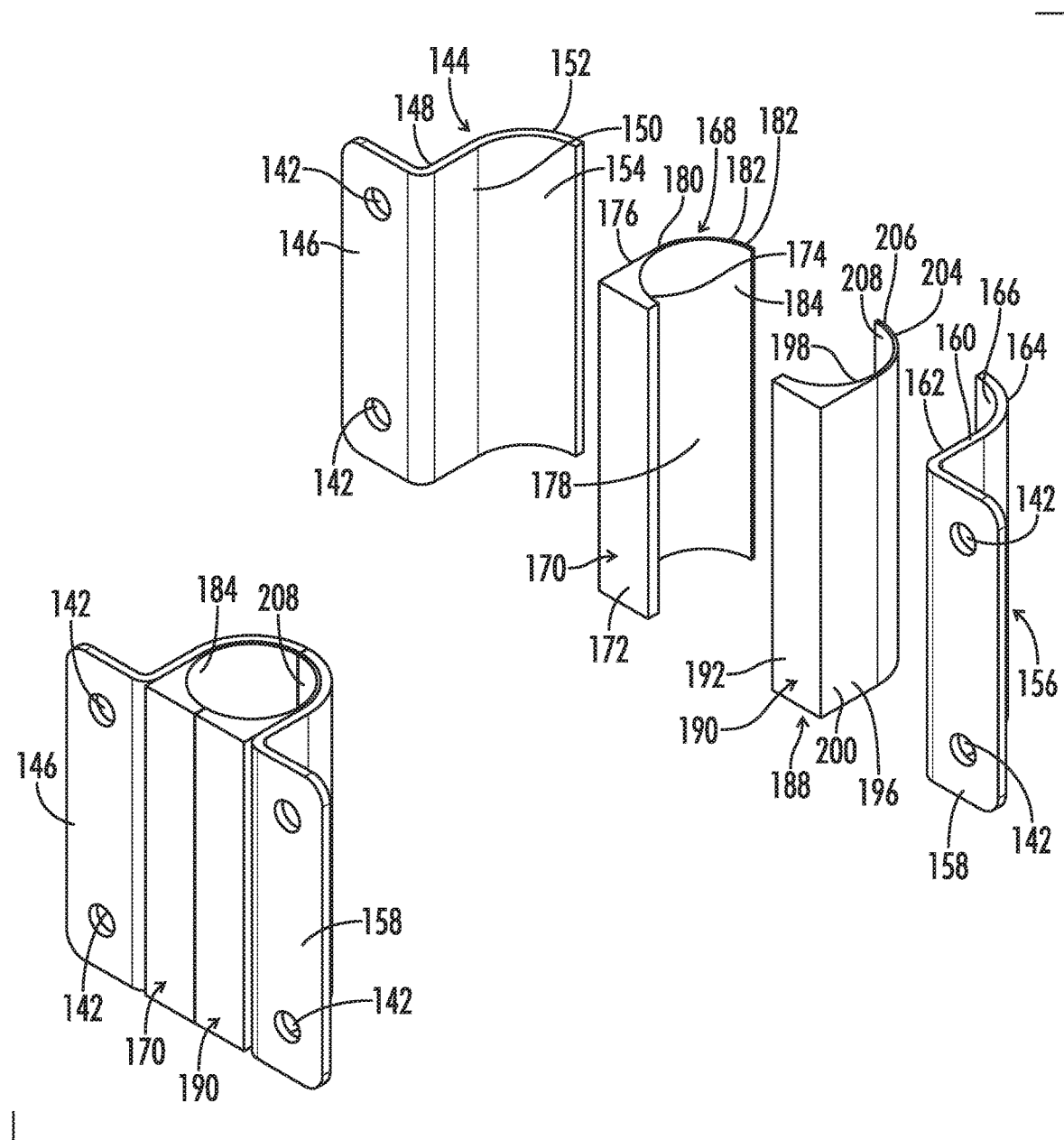
FIG. 5 illustrates exploded and assembled rear perspective views of a lock rod clamp of the sign frame of FIG. 2A.

Optionally, as shown in FIGS. 2A and 2E, the sign frame 82 further comprises a left vertical bracket 102 located behind the left lock rod bracket 92 and extending generally parallel to the left door height 56 and a right vertical bracket 104 behind the right lock rod bracket 94 and extending generally parallel to the left door height 56, and fasteners 100 connect the left vertical bracket 102 to the left horizontal bracket 84 and the left lock rod bracket 92, and fasteners 100 connect the right vertical bracket 104 to the right horizontal bracket 88 and the right lock rod bracket 94. Optionally, as partially shown in FIG. 2B, the left sign panel 96 is attached to the left vertical bracket 102 by a fastener 100 and the right sign panel 98 is attached to the right vertical bracket 104 by a fastener 100.

Optionally, as mentioned above and shown in FIGS. 1-4, the sign frame 82 is comprised of a left portion and a right portion, the left portion comprises the left horizontal bracket 84, the left lock rod bracket 92 and the left vertical bracket 102, which are configured to swing open and closed with the left door 32, and the right portion comprises the right horizontal bracket 88, the right lock rod bracket 94 and the right vertical bracket 104, which are configured to swing open and closed with the right door 34. Optionally, the left portion and right portion are not connected. Optionally, the right edge of the left portion and the left edge of the right portion are adjacent to each other when the left and right doors 32,34 are in the closed positions. Optionally, the right edge of the left portion and the left edge of the right portion are not adjacent to each other when the left and right doors 32,34 are in the open position. Optionally, as shown in FIGS. 1-4, the left portion further comprises a plurality of left side brackets 110 extending generally parallel to the left vertical bracket 102 and attached to the left horizontal bracket 84 by fasteners 100, and the right portion further comprises a plurality of right side brackets 112 extending generally parallel to the right vertical bracket 104 and attached to the right horizontal bracket 88 by fasteners 100. Optionally, at least one of the left side brackets 110 is connected to the left vertical bracket 102 by a left brace 114 extending generally parallel to the left door width 62 and at least one of the right side brackets 112 is connected to the right vertical bracket 104 by a right brace 116 extending generally parallel to the right door width 74. Optionally, the left and right vertical brackets 102,104 and the left and right side brackets 110,112 each comprise a plurality of slots 118 extending generally parallel to the left door height 56 and the left and right horizontal brackets 84,88 comprise a plurality of slots 118 extending generally parallel to the left door width 62.

Figure 8:
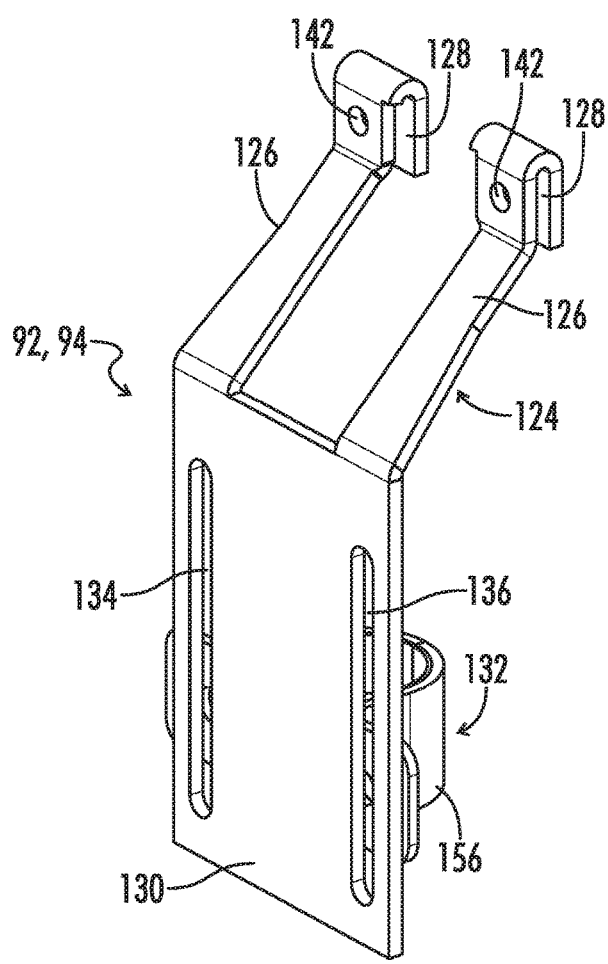
FIG. 8 illustrates a rear perspective view of a lock rod bracket and associated clamp of the sign frame of FIG. 2A.
Figure 9:
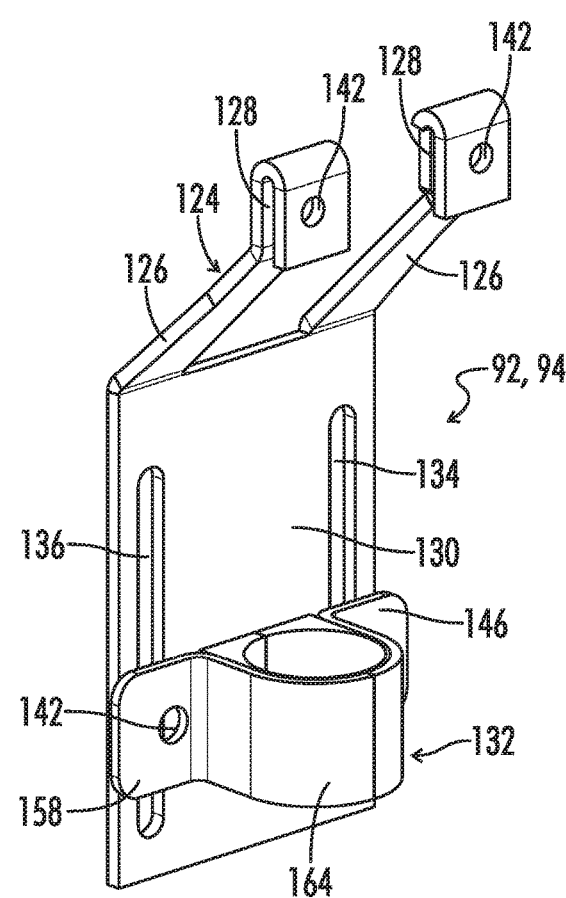
FIG. 9 illustrates a front perspective view of the lock rod bracket and associated clamp of FIG. 8.

Optionally, as best seen in FIG. 2E, the trailer 12 further comprises a left lock rod plate 120 attaching the left lock rod 76 to an upper portion of the left door 32 and a right lock rod plate 122 attaching the right lock rod 78 to an upper portion of the right door 34. Optionally, as best seen in FIGS. 8-9, the left lock rod bracket 92 comprises an upper portion 124 comprising a bent arm 126 comprising a recess 128 receiving a top end of the left lock rod plate 120, and the right lock rod bracket 94 comprises an upper portion 124 comprising a bent arm 126 comprising a recess 128 receiving a top end of the right lock rod plate 122. It will be appreciated that unless noted otherwise, use of the singular embraces the plural. Thus, as shown in FIGS. 8-9, the upper portion of the left and right lock rod brackets 92,94 may include two bent arms 126.

Optionally, as shown in FIGS. 8-9, the left lock rod bracket 92 further comprises a left lock rod bracket body 130 located below the left lock rod bracket upper portion 124 and a left lock rod clamp 132 located below the left lock rod bracket upper portion 124, attached to the left lock rod bracket body 130 and at least partially surrounding the left lock rod 76 and the right lock rod bracket 94 further comprises a right lock rod bracket body 130 located below the right lock rod bracket upper portion 124 and a right lock rod clamp 132 located below the right lock rod bracket upper portion 124, attached to the right lock rod bracket body 130 and at least partially surrounding the right lock rod 78.

Figure 6:
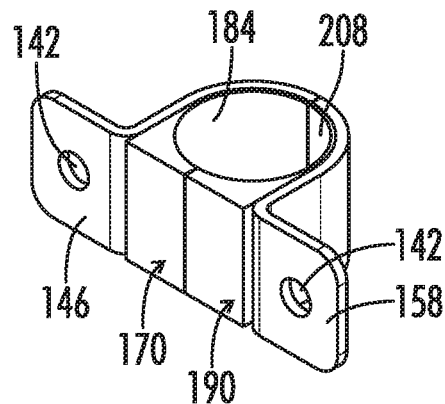
FIG. 6 illustrates an assembled rear perspective view of another lock rod clamp of the sign frame of FIG. 2A.
Figure 7:
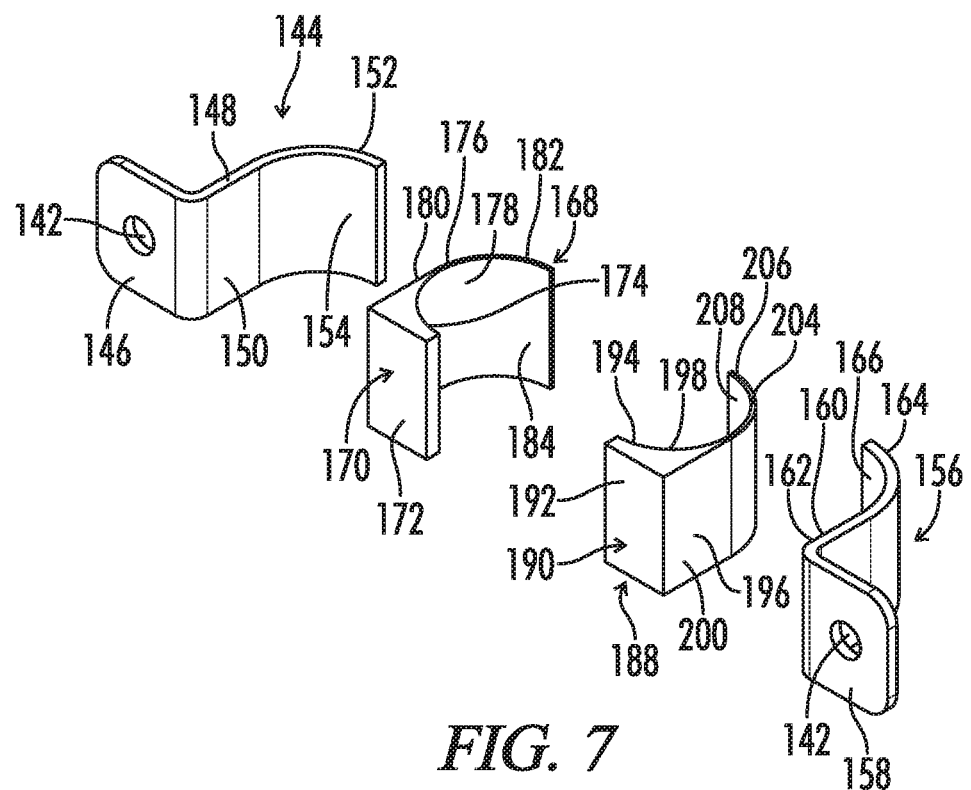
FIG. 7 illustrates an exploded rear perspective view of the lock rod clamp of FIG. 6.

Optionally, as best shown in FIGS. 8-9, the left lock rod bracket 92 comprises a left slot 118 extending generally parallel to the left door height 56 and a right slot 118 extending generally parallel to the left door height 56. Optionally, as best seen in FIGS. 6-8, the left lock rod clamp 132 comprises a left tab piece 144 comprising a left tab fastener hole 142 and a right tab piece 156 comprising a right tab fastener hole 142 and a right tab fastener 100 is positioned in the right slot 118 and the right tab fastener hole 142 and connects the right tab piece 156 to the right slot 118 and a left tab fastener 100 is positioned in the left slot 118 and the left tab fastener hole 142 and connects the left tab piece 144 to the left slot 118. It will be appreciated that the right lock rod bracket 94 may include similar parts and features More particularly, as best seen in FIGS. 5-8, the left lock rod clamp 132 is comprised of i) the left tab piece 144, the left tab piece comprising a left tab piece horizontal straight section 146 extending generally parallel to the left door width 62, abutting and located in front of the left lock rod bracket body 130 and comprising the left tab fastener hole 142, a left tab piece lateral straight section 148 extending forwardly from the left tab piece horizontal straight section 146 at an angle of approximately 90 degrees and comprising an interior surface 150, and a left tab piece curved section 152 extending forwardly from the left tab piece lateral straight section 148 and comprising an interior surface 154; ii) the right tab piece 156, the right tab piece 156 comprising a right tab piece horizontal straight section 158 extending generally parallel to the left door width 62, abutting and located in front of the left lock rod bracket body 130 and comprising the right tab fastener hole 142, a right tab piece lateral straight section 160 extending forwardly from the right tab piece horizontal straight section 158 and comprising an interior surface 162, and a right tab piece curved section 164 extending forwardly from the right tab piece lateral straight section 160, meeting the left tab piece curved section 152 and comprising an interior surface 154; iii) a left inner sleeve piece 168 nested inside the left tab piece 144 and comprising a left inner sleeve piece horizontal straight section 170 extending generally parallel to the left door width 62 and comprising an exterior surface 172 located in front of and abutting the left lock rod bracket 92 and an interior surface 174 abutting the left lock rod 76, a left inner sleeve piece lateral straight section 176 extending forwardly from the left inner sleeve piece horizontal straight section 170 at an angle of approximately 90 degrees and comprising an exterior surface 180 abutting the interior surface 150 of the left tab piece lateral straight section 148 and an interior surface 178 abutting the left lock rod 76, and a left inner sleeve piece curved section 182 comprising an exterior surface 186 abutting the interior surface 154 of the left tab piece curved section 152 and an interior surface abutting the left lock rod 76; and iv) a right inner sleeve piece 188 nested inside the right tab piece 156 and comprising a right inner sleeve piece horizontal straight section 190 extending generally parallel to the left door width 62, and comprising an exterior surface 192 abutting and located in front of the left lock rod bracket 92 and an interior surface 194 abutting the left lock rod 76, a right inner sleeve piece lateral straight section 196 extending from the right inner sleeve piece horizontal straight section 190 at an angle of approximately 90 degrees and comprising an interior surface 198 abutting the left lock rod 76 and an exterior surface 200 abutting the interior surface 162 of the right tab piece lateral straight section 160 and a right inner sleeve piece curved section 204 extending from the right inner sleeve piece lateral straight section 196 and comprising an exterior surface 200 abutting the interior surface of the right tab piece curved section 166 and an interior surface abutting the left lock rod 76, the right inner sleeve piece curved section 204 meeting the left inner sleeve piece curved section 182.

Figure 10:
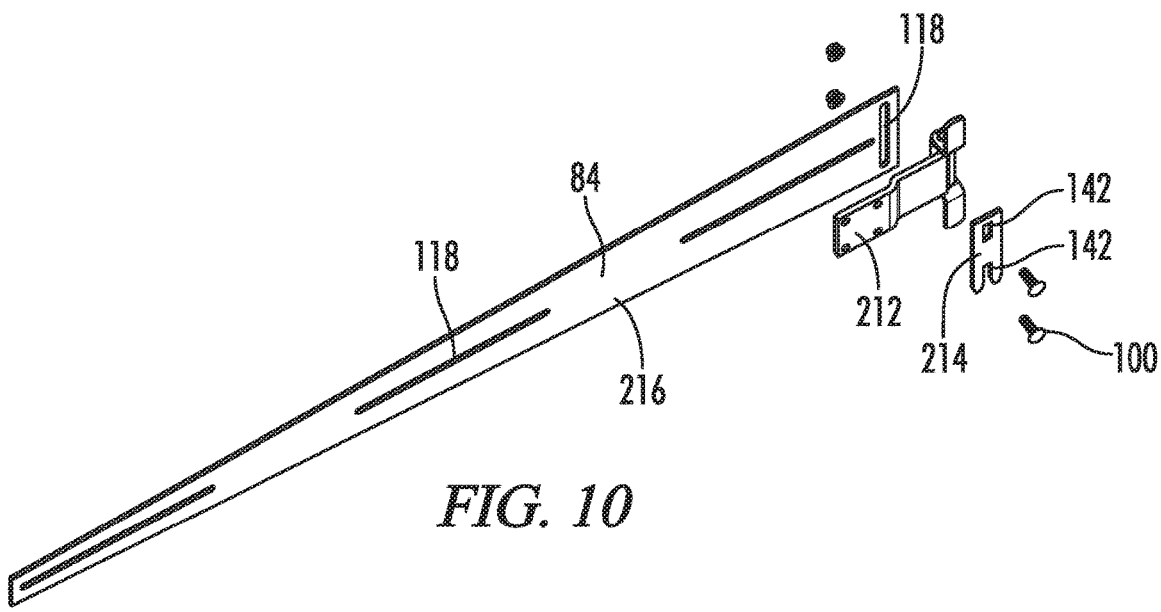
FIG. 10 illustrates an exploded front perspective view of an attachment plate, a hinge plate, and a horizontal bracket of the sign frame of FIG. 2A.
Figure 10A:
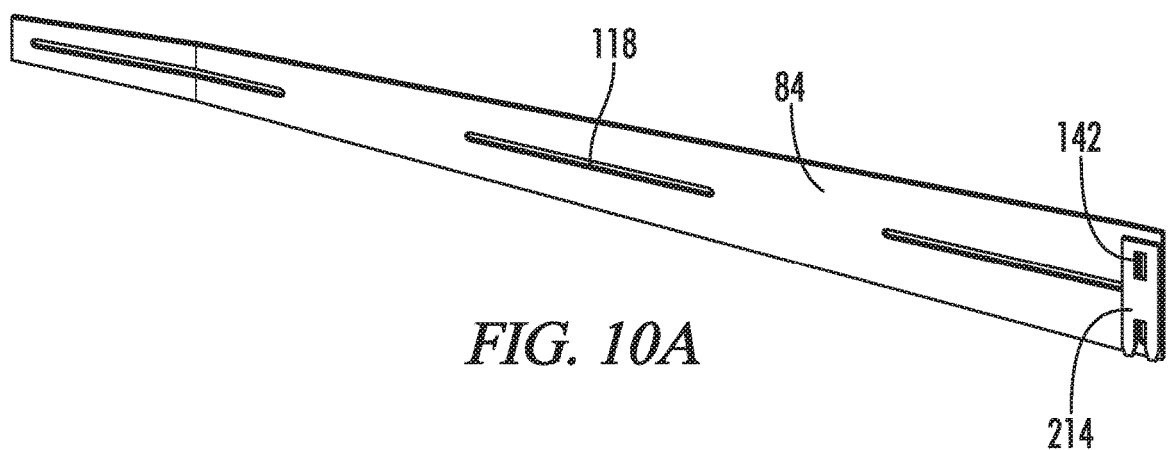
FIG. 10A illustrates an assembled front perspective view of the attachment plate, hinge plate and horizontal bracket of FIG. 10.

Optionally, as best seen in FIGS. 10-10A, the left hinge plate 42 comprises a left hinge plate front surface 210 facing the left rear door and a left hinge plate rear surface 212, the sign frame 82 further comprises a left hinge attachment plate 214 abutting the left hinge plate front surface 210, the left horizontal bracket 84 comprises a front surface 216 located to the rear of and abutting the left hinge plate rear surface 212, the left hinge plate 42 is located between the left horizontal bracket 84 and the left hinge attachment plate 214, and a fastener 100 extends between and connects the left hinge attachment plate 214 to the left horizontal bracket 84. The right horizontal plate bracket 88 may be similarly attached to the right hinge plate 46.

Figure 18:
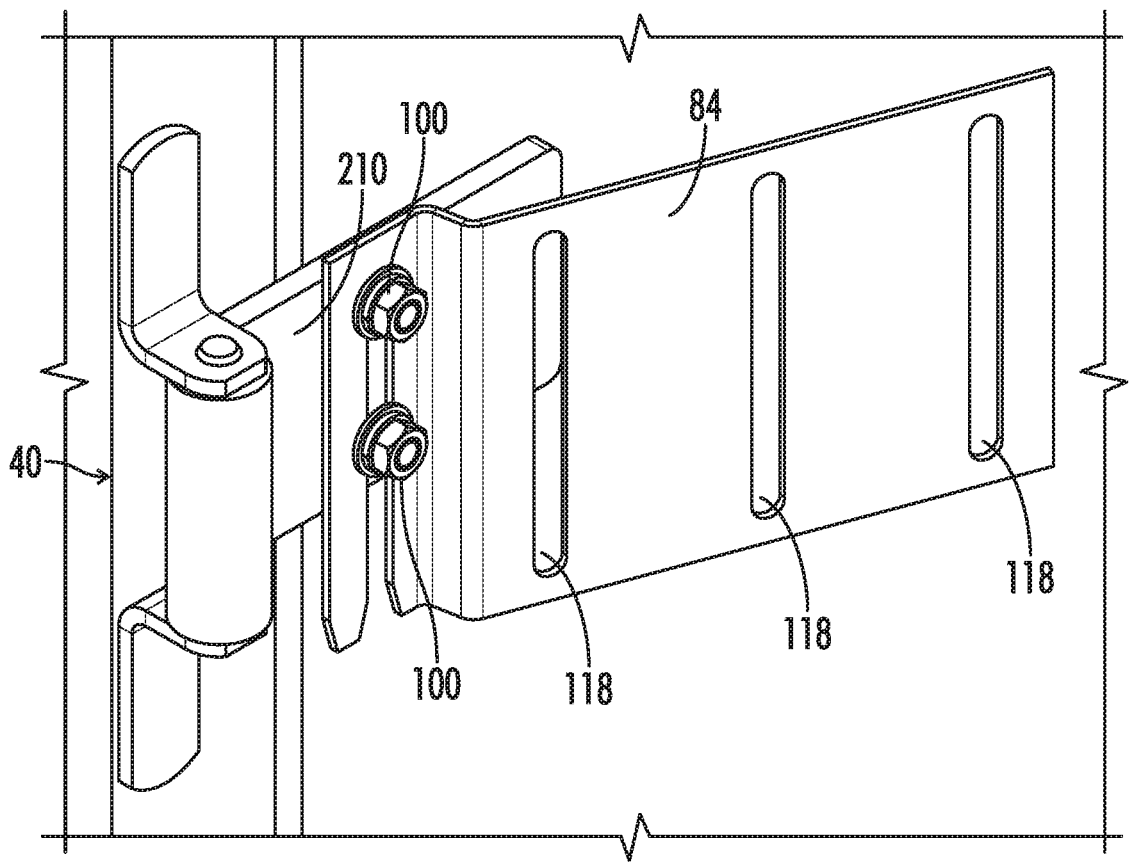
FIG. 18 illustrates a rear perspective view of the left horizontal bracket of the sign frame of FIG. 11 attached to the left hinge plate of the trailer of FIG. 11 using two fasteners.
Figure 19:
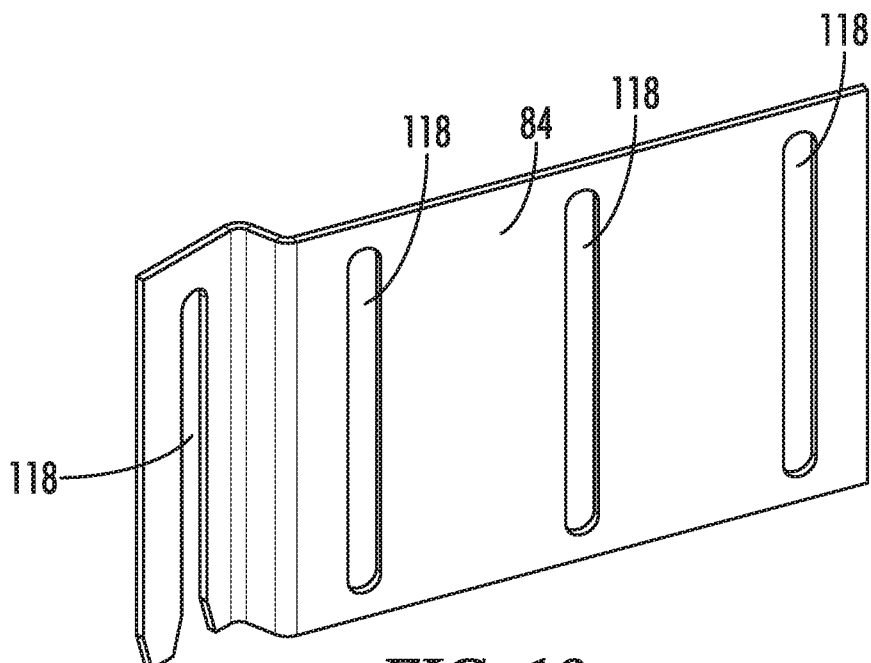
FIG. 19 illustrates a rear perspective view of the left horizontal bracket of FIG. 18.
Figure 20:
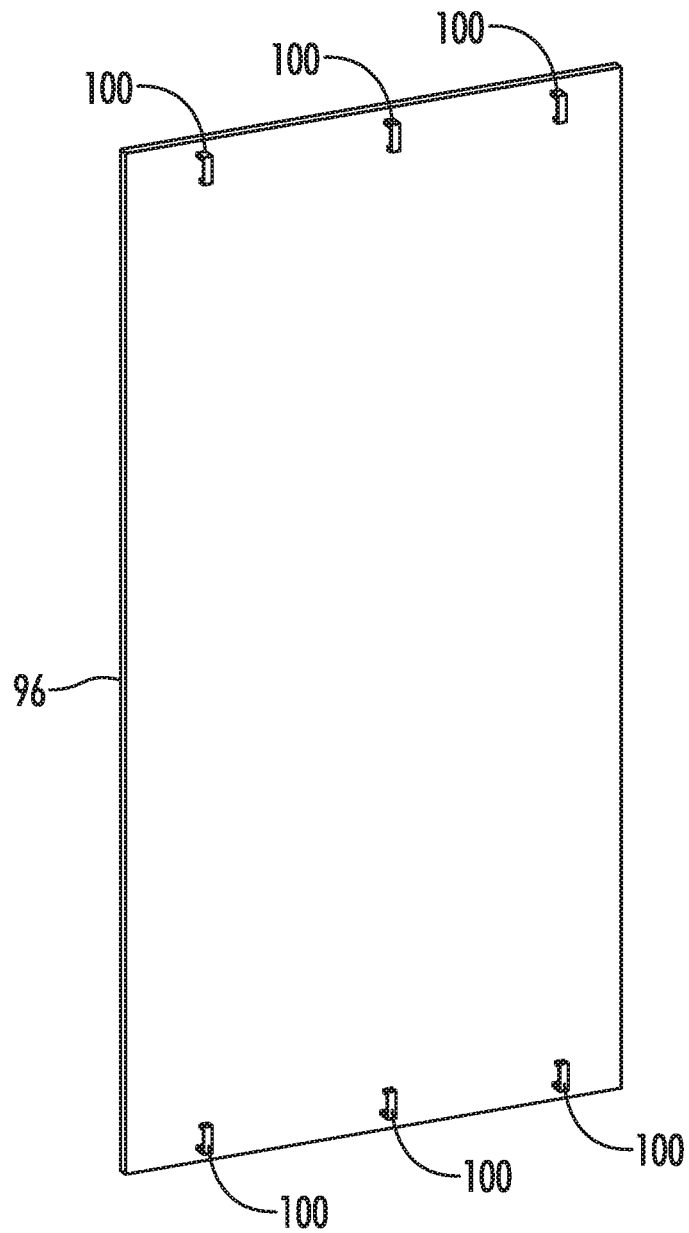
FIG. 20 illustrates a front perspective view of a sign panel that attaches to the frame via brackets instead of bolts.

Optionally, as best seen in FIGS. 18-19, the left horizontal bracket 84 bends outwardly adjacent the left hinge plate 42.

Optionally, as best seen in FIG. 2B, the left sign panel 96 comprises a left access panel 218 configured to pivot about a left access panel hinge 220 from a closed position in which the left access panel 218 is parallel to the left door 32 to an open position in which the left access panel 218 swings outwardly relative to the left door 32 and further wherein the right sign panel 98 comprises a right access panel 222 configured to pivot about a right access panel hinge 224 from a closed position in which the right access panel 222 is parallel to the right door 34 to an open position in which the right access panel 222 swings outwardly relative to the right door 34. Optionally, as best seen in FIG. 2B, the left access panel 218 comprises a left access panel lock 226 and the left sign panel 96 comprises a left access panel lock 226 located above the left access panel hinge 220 and configured to mate with the left access panel lock 226 and secure the left access panel 218 in the open position and further wherein the right access panel 222 comprises a right access panel lock 226 and the right sign panel 98 comprises a right sign panel lock 226 located above the right access panel hinge 224 and configured to mate with the right access panel lock 226 and secure the right access panel 222 in the open position (so the driver can access the lock rods 76,78 and handles associated therewith to open the left and right doors). Alternatively, the left and right access panels 218,222 may comprise magnets to hold the right and left access panels open.

Optionally, the sign comprises an electronic display.

PART LIST

| Part List | |
|---|---|
| Trailer system | 10 |
| Trailer | 12 |
| Trailer bottom | 14 |
| Wheels | 16 |
| Trailer top | 18 |
| Trailer height | 20 |
| Left side | not shown |
| Right side | 24 |
| Trailer width | 26 |
| Trailer front | 28 |
| Trailer rear | 30 |
| Left door | 32 |
| Right door | 34 |
| Trailer length | 36 |
| Trailer interior | not shown |
| Left hinge | 40 |
| Left hinge plate | 42 |
| Right hinge | 44 |
| Right hinge plate | 46 |
| Left pivot axis | 48 |
| Right pivot axis | 50 |
| Left door top | 52 |
| Left door bottom | 54 |
| Left door height | 56 |
| Left door left side edge | 58 |
| Left door right side edge | 60 |
| Left door width | 62 |
| Right door top | 64 |
| Right door bottom | 66 |
| Right door height | 68 |
| Right door left side edge | 70 |
| Right door right side edge | 72 |
| Right door width | 74 |
| Left lock rod | 76 |
| Right lock rod | 78 |
| Motor | not shown |
| Sign frame | 82 |
| Left horizontal bracket | 84 |
| Left horizontal bracket height | 86 |
| Right horizontal bracket | 88 |
| Right horizontal bracket height | 90 |
| Left lock rod bracket | 92 |
| Right lock rod bracket | 94 |
| Left sign panel | 96 |
| Right sign panel | 98 |
| Fastener | 100 |
| Left vertical bracket | 102 |
| Right vertical bracket | 104 |
| Left portion of sign frame | 106 |
| Right portion of sign frame | 108 |
| Left side brackets | 110 |
| Right side brackets | 112 |
| Left brace | 114 |
| Right brace | 116 |
| Slots | 118 |
| Left lock rod plate | 120 |
| Right lock rod plate | 122 |
| Bracket upper portion | 124 |
| Bent arm | 126 |

-continued

| Part List | |
|---|---|
| Recess | 128 |
| Bracket body | 130 |
| Lock rod clamp | 132 |
| Bracket left sleeve | 134 |
| Bracket right sleeve | 136 |
| Left latch | 138 |
| Right latch | 140 |
| Fastener hole | 142 |
| Left tab piece | 144 |
| Left tab piece horizontal straight section | 146 |
| Left tab piece lateral straight section | 148 |
| Left tab piece lateral straight section Interior surface | 150 |
| Left tab piece curved section | 152 |
| Left tab piece curved section interior surface | 154 |
| Right tab piece | 156 |
| Right tab piece horizontal straight section | 158 |
| Right tab piece lateral straight section | 160 |
| Right tab piece lateral straight section interior surface | 162 |
| Right tab piece curved section | 164 |
| Right tab piece curved section interior surface | 166 |
| Left inner sleeve piece | 168 |
| Left inner sleeve piece horizontal straight section | 170 |
| Left inner sleeve piece horizontal straight section Exterior surface | 172 |
| Left inner sleeve piece horizontal straight section interior surface | 174 |
| Left inner sleeve piece lateral straight section | 176 |
| Left inner sleeve piece lateral straight section interior surface | 178 |
| Left inner sleeve piece lateral straight section exterior surface | 180 |
| Left inner sleeve piece curved section | 182 |
| Left inner sleeve piece curved section interior surface | 184 |
| Left inner sleeve piece curved section exterior surface | 186 |
| Right inner sleeve piece | 188 |
| Right inner sleeve piece horizontal straight section | 190 |
| Right inner sleeve piece horizontal straight section exterior surface | 192 |
| Right inner sleeve piece horizontal straight section interior surface | 194 |
| Right inner sleeve piece lateral straight section | 196 |
| Right inner sleeve piece lateral straight section interior surface | 198 |
| Right inner sleeve piece lateral straight section exterior surface | 200 |
| Right inner sleeve piece curved section | 204 |
| Right inner sleeve piece curved section exterior surface | 206 |
| Right inner sleeve piece curved section interior surface | 208 |
| Left hinge plate front surface | 210 |
| Left hinge plate rear surface | 212 |
| Left hinge attachment plate | 214 |
| Left horizontal bracket front surface | 216 |
| Left access panel | 218 |
| Left panel access hinge | 220 |
| Right access panel | 222 |
| Right panel access hinge | 224 |
| Access Panel Lock | 226 |
| Sign Panel Lock | 228 |
| Vehicle cab | Not shown |
| u-shaped segment | 230 |
| Left straight tab associated with u-shaped segment | 232 |
| Right straight tab associated with u-shaped segment | 234 |
| Left c-shaped piece | 236 |

-continued

| Part List | |
|---|---|
| Front straight tab of left c-shaped piece | 238 |
| Intermediate segment of left c-shaped piece | 240 |
| Rear straight tab of left c-shaped piece | 242 |
| Right c-shaped piece | 244 |
| Front straight tab of right c-shaped piece | 246 |
| Intermediate segment of right c-shaped piece | 248 |
| Rear straight tab of right c-shaped piece | 250 |

Having now described the invention in accordance with the requirements of the patent statutes, those skilled in the art will understand how to make changes and modifications to the disclosed embodiments to meet their specific requirements or conditions. Changes and modifications may be made without departing from the scope and spirit of the invention. In addition, the steps of any method described herein may be performed in any suitable order and steps may be performed simultaneously if needed. Use of the singular embraces the plural.

Terms of degree such as "generally", "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

What is claimed is:

1. A trailer system comprising:
   a trailer comprising a bottom, a plurality of wheels extending below the trailer bottom and configured to ride along a street, a top, a height extending from the top to the bottom, a left side, a right side, a width extending from the left side to the right side and generally perpendicular to the height, a front, a rear comprising a left door and a right door, and a length extending from the front to the rear and generally perpendicular to the width and the height,
   wherein the top, the bottom, the left side, the right side, the front, the left door and the right door define a trailer interior,
   wherein the left door is attached to a left hinge comprising a left hinge plate and the right door is attached to a right hinge comprising a right hinge plate, the left hinge having a left pivot axis generally parallel to the trailer height, the right hinge having a right pivot axis generally parallel to the trailer height,
   wherein the left door is configured to swing outwardly about the left pivot axis from a closed position to an open position,
   wherein the right door is configured to swing outwardly about the right pivot axis from a closed position to an open position,
   wherein the left door comprises a left door top, a left door bottom, a left door height extending from the left door top to the left door bottom, a left door left side edge, a left door right side edge, and a left door width extending from the left door left side edge to the left door right side edge and generally perpendicular to the left door height,
   wherein the right door comprises a right door top, a right door bottom, a right door height extending from the right door top to the right door bottom, a right door left side edge, a right door right side edge, and a right door width extending from the right door left side edge to the right door right side edge and generally perpendicular to the right door height, wherein, when the left and right doors are in the closed position, the right edge of the left door and the left edge of the right door meet and the left and right door widths are generally parallel to the trailer width, wherein, when the left and right doors are in the open position, the right edge of the left door and the left edge of the right door do not meet and the left and right door widths are not generally parallel to the trailer width, wherein the trailer comprises a left lock rod extending generally parallel to the left door height and a right lock rod extending generally parallel to the right door height, wherein the left lock rod and the right lock rod are configured to secure the left and right doors in the closed positions;

a motor configured to propel the trailer;

a sign frame disposed behind the left door and the right door and comprising a left horizontal bracket connected to the left hinge and extending from the left hinge towards the left lock rod generally parallel to the left door width, a right horizontal bracket connected to the right hinge and extending from the right hinge toward the right lock rod generally parallel to the right door width, a left lock rod bracket connected to the left lock rod and located behind the left lock rod, and a right lock rod bracket connected to the right lock rod, and located behind the right lock rod; and a sign disposed behind the sign frame and connected to the sign frame, the sign comprising a left sign panel configured to swing with the left door as the left door swings from the closed position to the open position and a right sign panel configured to swing with the right door as the right door swings from the closed position to the open position.

2. The system of claim 1 wherein the left horizontal bracket is pennant-shaped and tapers in height from the left hinge towards the left lock rod and the right horizontal bracket is pennant-shaped and tapers in height from the right hinge towards the right lock rod.

3. The system of claim 1 wherein the sign frame further comprises a left vertical bracket located behind the left lock rod bracket and extending generally parallel to the left door height and a right vertical bracket behind the right lock rod bracket and extending generally parallel to the left door height, and further wherein fasteners connect the left vertical bracket to the left horizontal bracket and the left lock rod bracket, and fasteners connect the right vertical bracket to the right horizontal bracket and the right lock rod bracket.

4. The system of claim 3 wherein the left sign panel is attached to the left vertical bracket by a fastener and the right sign panel is attached to the right vertical bracket by a fastener.

5. The system of claim 3 wherein the sign frame is comprised of a left portion and a right portion, the left portion comprising the left horizontal bracket, the left lock rod bracket and the left vertical bracket, wherein the left horizontal bracket, the left lock rod bracket and the left vertical bracket are configured to swing open and closed with the left door, the right portion comprising the right horizontal bracket, the right lock rod bracket and the right vertical bracket, and further wherein the right horizontal bracket, the right lock rod bracket and the right vertical bracket are configured to swing open and closed with the right door, wherein the left portion and right portion are not connected, wherein the left portion and the right portion are adjacent to each other when the left and right doors are in the closed positions, and further wherein the left portion and the right portion are not adjacent to each other when the left and right doors are in the open position.

6. The system of claim 5 wherein the left portion further comprises a plurality of left side brackets extending generally parallel to the left vertical bracket and attached to the left horizontal bracket by fasteners, and further wherein the right portion further comprises a plurality of right side brackets extending generally parallel to the right vertical bracket and attached to the right horizontal bracket by fasteners.

7. The system of claim 6 wherein at least one of the left side brackets is connected to the left vertical bracket by a left brace extending generally parallel to the left door width and further wherein at least one of the right side brackets is connected to the right vertical bracket by a right brace extending generally parallel to the right door width.

8. The system of claim 6 wherein the left vertical bracket and the left side brackets each comprise a plurality of slots extending generally parallel to the left door height and further wherein the left horizontal bracket comprises a plurality of slots extending generally parallel to the left door width.

9. The system of claim 3 wherein the trailer further comprises a left lock rod plate attaching the left lock rod to an upper portion of the left door and a right lock rod plate attaching the right lock rod to an upper portion of the right door, wherein the left lock rod bracket comprises an upper portion comprising a bent arm comprising a recess receiving a top end of the left lock rod plate, and further wherein the right lock rod bracket comprises an upper portion comprising a bent arm comprising a recess receiving a top end of the right lock rod plate.

10. The system of claim 9 wherein the left lock rod bracket further comprises a left lock rod bracket body located below the left lock rod bracket upper portion and a left lock rod clamp located below the left lock rod bracket upper portion, attached to the left lock rod bracket body and at least partially surrounding the left lock rod and further wherein the right lock rod bracket further comprises a right lock rod bracket body located below the right lock rod bracket upper portion and a right lock rod clamp located below the right lock rod bracket upper portion, attached to the right lock rod bracket body and at least partially surrounding the right lock rod.

11. The system of claim 10 wherein the left lock rod bracket comprises a left slot extending generally parallel to the left door height and a right slot extending generally parallel to the left door height, wherein the left lock rod clamp comprises a left tab piece comprising a left tab fastener hole and a right tab piece comprising a right tab fastener hole and further wherein a right tab fastener is positioned in the right slot and the right tab fastener hole and connects the right tab piece to the right slot and further wherein a left tab fastener is positioned in the left slot and the left tab fastener hole and connects the left tab piece to the left slot.

12. The system of claim 11 wherein the left lock rod clamp is comprised of i) the left tab piece, the left tab piece comprising a left tab piece horizontal straight section extending generally parallel to the left door width, abutting and located in front of the left lock rod bracket body and comprising the left tab fastener hole, a left tab piece lateral straight section extending forwardly from the left tab piece horizontal straight section at an angle of approximately 90 degrees and comprising an interior surface, and a left tab piece curved section extending forwardly from the left tab piece lateral straight section and comprising an interior surface; ii) the right tab piece, the right tab piece comprising a right tab piece horizontal straight section extending generally parallel to the left door width, abutting and located in front of the left lock rod bracket body and comprising the right tab fastener hole, a right tab piece lateral straight section extending forwardly from the right tab piece horizontal straight section and comprising an interior surface, and a right tab piece curved section extending forwardly from the right tab piece lateral straight section, meeting the left tab piece curved section and comprising an interior surface; iii) a left inner sleeve piece nested inside the left tab piece and comprising a left inner sleeve piece horizontal straight section extending generally parallel to the left door width and comprising an exterior surface located in front of and abutting the left lock rod bracket and an interior surface abutting the left lock rod, a left inner sleeve piece lateral straight section extending forwardly from the left inner sleeve piece horizontal straight section at an angle of approximately 90 degrees and comprising an exterior surface abutting the interior surface of the left tab piece lateral straight section and an interior surface abutting the left lock rod, and a left inner sleeve piece curved section comprising an exterior surface abutting the interior surface of the left tab piece curved section and an interior surface abutting the left lock rod; and iv) a right inner sleeve piece nested inside the right tab piece and comprising a right inner sleeve piece horizontal straight section extending generally parallel to the left door width, and comprising an exterior surface abutting and located in front of the left lock rod bracket and an interior surface abutting the left lock rod, a right inner sleeve piece lateral straight section extending from the right inner sleeve piece horizontal straight section at an angle of approximately 90 degrees and comprising an interior surface abutting the left lock rod and an exterior surface abutting the interior surface of the right tab piece lateral straight section and a right inner sleeve piece curved section extending from the right inner sleeve piece lateral straight section and comprising an exterior surface abutting the interior surface of the right tab piece curved section and an interior surface abutting the left lock rod, the right inner sleeve piece curved section meeting the left inner sleeve piece curved section.

13. The system of claim 1 wherein the left hinge plate comprises a left hinge plate front surface facing the left rear door and a left hinge plate rear surface, wherein the sign frame further comprises a left hinge attachment plate abutting the left hinge plate front surface, wherein the left horizontal bracket comprises a front surface located to the rear of and abutting the left hinge plate rear surface, wherein the left hinge plate is located between the left horizontal bracket and the left hinge attachment plate, and further wherein a fastener extends between and connects the left hinge attachment plate to the left horizontal bracket.

14. The system of claim 1 wherein the left horizontal bracket bends outwardly adjacent the left hinge plate.

15. The system of claim 1 wherein the left sign panel comprises a left access panel configured to pivot about a left access panel hinge from a closed position in which the left access panel is parallel to the left door to an open position in which the left access panel swings outwardly relative to the left door and further wherein the right sign panel comprises a right access panel configured to pivot about a right access panel hinge from a closed position in which the right access panel is parallel to the right door to an open position in which the right access panel swings outwardly relative to the right door.

16. The system of claim 15 wherein the left access panel comprises a left access panel lock and the left sign panel comprises a left access panel lock located above the left access panel hinge and configured to mate with the left access panel lock and secure the left access panel in the open position and further wherein the right access panel comprises a right access panel lock and the right sign panel comprises a right sign panel lock located above the right access panel hinge and configured to mate with the right access panel lock and secure the right access panel in the open position.

17. The system of claim 1 further comprising a vehicle cab in front of the trailer, the vehicle cab comprising the motor.

18. The system of claim 1 wherein the sign comprises an electronic display.

* * * * *